US012003966B2

(12) United States Patent
Monteuuis et al.

(10) Patent No.: US 12,003,966 B2
(45) Date of Patent: Jun. 4, 2024

(54) LOCAL MISBEHAVIOR PREVENTION SYSTEM FOR COOPERATIVE INTELLIGENT TRANSPORTATION SYSTEMS

(71) Applicant: QUALCOMM Incorporated, San Diego, CA (US)

(72) Inventors: Jean-Philippe Monteuuis, Shrewsbury, MA (US); Jonathan Petit, Wenham, MA (US); Cong Chen, Shrewsbury, MA (US); Mohammad Raashid Ansari, Lowell, MA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/451,509

(22) Filed: Oct. 20, 2021

(65) Prior Publication Data

US 2022/0232383 A1 Jul. 21, 2022

Related U.S. Application Data

(60) Provisional application No. 63/138,916, filed on Jan. 19, 2021.

(51) Int. Cl.
*H04W 12/088* (2021.01)
*H04W 4/12* (2009.01)
*H04W 4/40* (2018.01)
*H04W 12/069* (2021.01)
*H04W 12/106* (2021.01)

(52) U.S. Cl.
CPC .......... *H04W 12/088* (2021.01); *H04W 4/12* (2013.01); *H04W 4/40* (2018.02); *H04W 12/069* (2021.01); *H04W 12/106* (2021.01)

(58) Field of Classification Search
CPC .... H04W 12/088; H04W 4/12; H04W 12/106
See application file for complete search history.

(56) References Cited

U.S. PATENT DOCUMENTS

| 11,139,990 B2* | 10/2021 | Ambrosin ............. H04L 9/0869 |
| 11,153,721 B2* | 10/2021 | Graefe .................... H04W 4/38 |
| 11,252,567 B2* | 2/2022 | Yang ..................... H04W 12/12 |

(Continued)

FOREIGN PATENT DOCUMENTS

EP      3869841 A1    8/2021

OTHER PUBLICATIONS

International Search Report and Written Opinion—PCT/US2021/060929—ISA/EPO—Feb. 24, 2022 18 pages.

(Continued)

*Primary Examiner* — Viral S Lakhia
(74) *Attorney, Agent, or Firm* — The Marbury Law Group

(57) ABSTRACT

In various embodiments, a vehicle-to-everything (V2X) processing device may receive V2X messages from intelligent transportation system (ITS) stations, analyze information in received V2X messages to detect misbehavior conditions, and add a station identifier associated with a V2X message received from an ITS station to a local blocking list in response to detecting a misbehavior condition in the V2X message received from the ITS station. In some embodiments, the V2X processing device may transmit a misbehavior report to a management entity in response to detecting the misbehavior condition in the V2X message.

25 Claims, 18 Drawing Sheets

(56) References Cited

U.S. PATENT DOCUMENTS

| | | | | |
|---|---|---|---|---|
| 11,303,458 | B2* | 4/2022 | Barrett | H04W 12/12 |
| 11,388,598 | B2* | 7/2022 | Yang | G06F 13/40 |
| 11,588,636 | B2* | 2/2023 | Arzelier | H04L 9/3263 |
| 11,611,580 | B1* | 3/2023 | Sharifi Mehr | H04L 63/145 |
| 11,863,546 | B2* | 1/2024 | McCall | H04L 63/0823 |
| 2017/0213461 | A1* | 7/2017 | Murray | H04W 4/12 |
| 2018/0322785 | A1* | 11/2018 | Jerichow | G08G 1/162 |
| 2020/0057872 | A1* | 2/2020 | Ingraham | H04L 9/085 |
| 2020/0128409 | A1* | 4/2020 | Yang | H04L 63/1416 |
| 2020/0137580 | A1* | 4/2020 | Yang | H04W 4/44 |
| 2020/0258320 | A1* | 8/2020 | Lu | G08G 1/092 |
| 2021/0084461 | A1* | 3/2021 | Kim | H04W 4/40 |
| 2021/0114606 | A1* | 4/2021 | Alvarez | G06N 3/047 |
| 2021/0144003 | A1* | 5/2021 | Arzelier | H04L 9/3263 |
| 2022/0095115 | A1* | 3/2022 | Shimizu | H04W 12/104 |
| 2022/0126864 | A1* | 4/2022 | Moustafa | G08G 1/096758 |
| 2022/0376931 | A1* | 11/2022 | Simplicio, Jr. | H04L 67/12 |

OTHER PUBLICATIONS

Moore T., et al., "Fast Exclusion of Errant Devices from Vehicular Networks", 5th Annual IEEE Communications Society Conference on Sensor, Mesh and Ad Hoc Communications and Networks, 2008, SECON '08. IEEE, Piscataway, NJ, USA, Jun. 16, 2008 (Jun. 16, 2008), pp. 135-143, XP031282586, ISBN: 978-1-4244-1777-3 the whole document.

* cited by examiner

Example protocol stack and related core standards for C-ITS in Europe

LOCAL MISBEHAVIOR PREVENTION SYSTEM FOR COOPERATIVE INTELLIGENT TRANSPORTATION SYSTEMS

RELATED APPLICATIONS

This application claims the benefit of priority to U.S. Provisional Patent Application No. 63/138,916 titled "Local Misbehavior Prevention System for Cooperative Intelligent Transportation" filed on Jan. 19, 2021, the entire contents of which are hereby incorporated by reference for all purposes.

BACKGROUND

Various standards are under development for vehicle-to-everything (V2X) communications systems and functionality. The 802.11p standard developed by the Institute of Electrical and Electronics Engineers (IEEE) is the basis for the Dedicated Short Range Communication (DSRC) and ITS-G5 communication standards. IEEE 1609 is a higher layer standard based on IEEE 802.11p. The Cellular Vehicle-to-Everything (C-V2X) standard is a competing standard developed under the auspices of the 3rd Generation Partnership Project. These standards serve as the foundation for vehicle-based wireless communications, and may be used to support intelligent highways, autonomous and semi-autonomous vehicles, and improve the overall efficiency and safety of the highway transportation systems. Other V2X wireless technologies are also under consideration in different regions of the world. The techniques described herein are applicable to any V2X wireless technology.

C-V2X defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated ITS 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation new radio wireless mobile communication technologies (5G NR systems, etc.), etc.

Multiple regions of the world are developing standards for vehicle-based communication systems and functionality, for example standards developed in IEEE 1609 and SAE for use in North America, or in ETSI and CEN for use in Europe. Part of that system is the ability for a vehicle to broadcast Basic Safety Messages ("BSM" in the figures; used in North America) or Cooperative Awareness Messages (CAM; used in Europe) that other vehicles can receive and process to improve traffic safety and efficiency. The processing of such messages in the transmitting and receiving vehicles occurs in onboard equipment that provide the V2X functionality (referred to herein as "V2X onboard equipment").

In V2X communications, it is important that inaccurate, corrupted, or hacked (i.e., bad) data is detected in order to prevent such inaccurate data from further dissemination. However, as an increasing number of vehicles are equipped to participate in such networks, the volume of potential misbehavior condition data is large and growing at an exponential rate. Thus, the management of such detected misbehavior conditions may be controlled in order to effectively utilize V2X messaging. Misbehavior detection systems are important to perform the function of detection of bad data as well as the generation of misbehavior reports (MBR). MBRs need to be generated, stored locally, and transmitted to a trusted third party for investigation (e.g., a Misbehavior Authority). Thus, the integrity and functionality of V2X onboard equipment will be a significant design consideration as V2X systems are fielded.

SUMMARY

Various aspects include methods of local misbehavior message filtering performed by a vehicle-to-everything (V2X) processing device. Various aspects may include receiving the V2X message from an intelligent transportation system (ITS) station, analyzing information in the received V2X message to detect the misbehavior condition in the V2X message, and adding a station identifier associated with a V2X message received from the ITS station to a local blocking list in response to detecting a misbehavior condition in the V2X message received from the ITS station. Some aspects may include transmitting a misbehavior report to a management entity in response to detecting the misbehavior condition in the V2X message. In such aspects, transmitting the misbehavior report to the management entity in response to detecting the misbehavior condition in the V2X message may be performed upon adding the station identifier associated with the V2X message received from an ITS station to the local blocking list.

Some aspects may include determining whether a station identifier associated with another received V2X message is present in the local blocking list, and blocking the V2X message from further processing in response to determining that the station identifier associated with the another received V2X message is present in the local blocking list. Such aspects may include determining a type of misbehavior associated with the station identifier that is present in the local blocking list, and determining a blocking time period based on the type of misbehavior. In such aspects, blocking the V2X message from further processing in response to determining that the station identifier associated with the V2X message is present in the local blocking list may include blocking the V2X message from further processing for the blocking time period.

In some aspects, adding the station identifier associated with the V2X message received from an intelligent transportation system (ITS) station to the local blocking list in response to detecting a misbehavior condition in the V2X message received from the ITS station may include determining whether to add the station identifier associated with the V2X message received from the ITS station to the local blocking list in response to detecting a misbehavior condition in the V2X message received from the ITS station, and adding the station identifier associated with the V2X message to the local blocking list in response to determining that the station identifier should be added to the local blocking list.

Some aspects may include receiving a certificate revocation list (CRL) including one or more station identifiers, and updating the local blocking list based on the one or more station identifiers in the CRL. In some aspects, updating the local blocking list based on the one or more station identifiers of the CRL may include removing the station identifier associated with the V2X message from the local blocking list. In some aspects, updating the local blocking list based on the one or more station identifiers of the CRL may include increasing a blocking time period for the station identifier associated with the V2X message.

Further aspects include a V2X processing device including a processor configured to perform operations of any of the methods summarized above. Further aspects include a misbehavior management system including a memory and a processor configured to perform operations of any of the methods summarized above. Further aspects may include a V2X processing device having various means for performing functions corresponding to any of the methods summarized above. Further aspects may include a non-transitory processor-readable storage medium having stored thereon processor-executable instructions configured to cause a processor of a V2X processing device to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
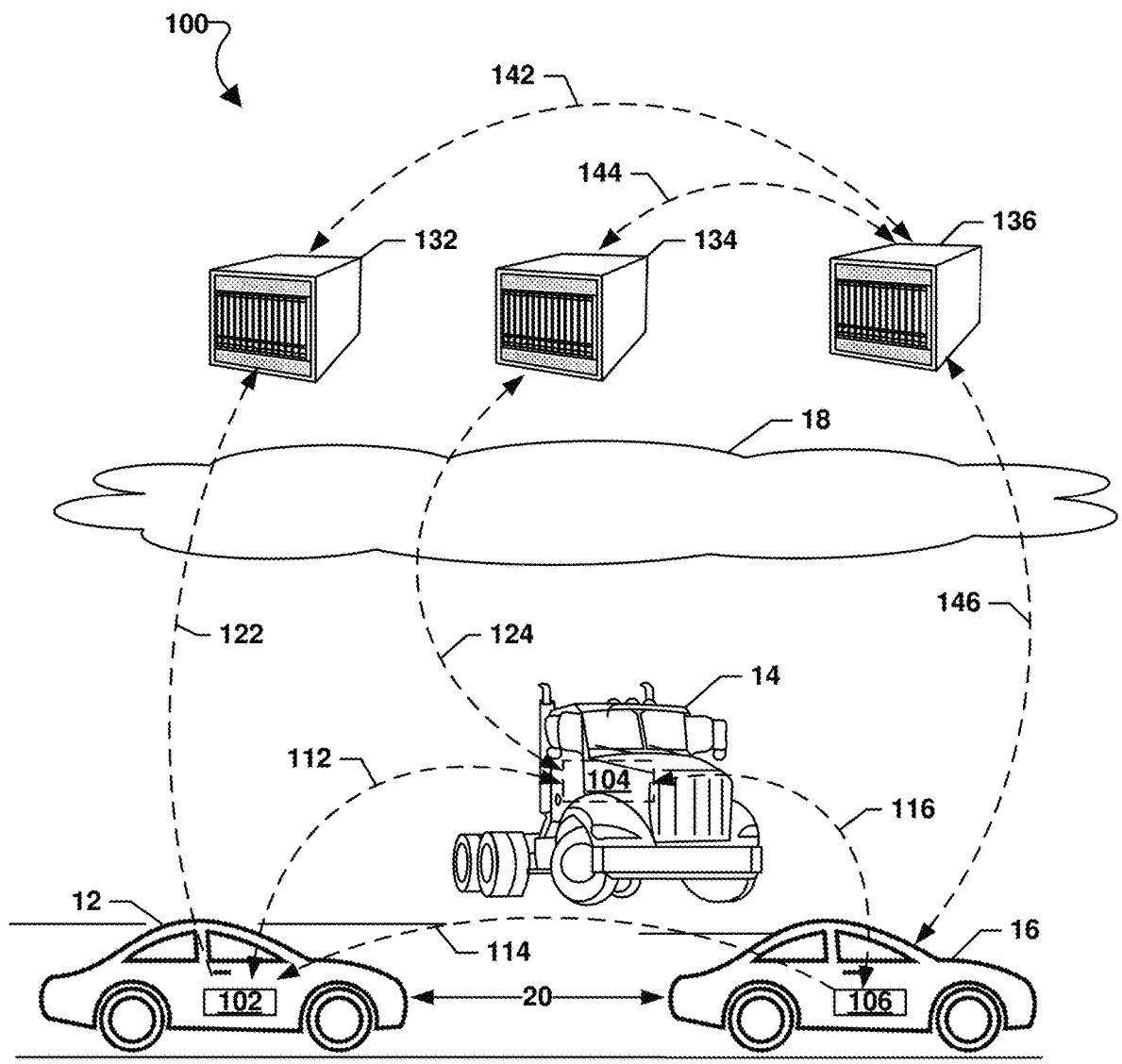
FIG. 1A is a system block diagram illustrating an example V2X system suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In overview, various embodiments include methods and mechanisms for local management of misbehavior of an intelligent transportation system (ITS) station that is detected by V2X onboard equipment. While the V2X onboard equipment also may report such misbehavior to a managing authority such as a misbehavior managing authority and/or a security credential management system (SCMS), the managing authority may take hours or days to response with information such as a Certificate Revocation List (CRL). Various embodiments enable a V2X processing device (e.g., of the V2X onboard equipment) to respond to detected misbehavior rapidly relative to the response time of a managing authority.

V2X systems and technologies hold great promise for improving traffic flows and vehicle safety by enabling vehicles to share information regarding their location, speed, direction of travel, braking, and other factors that may be useful to other vehicles for anti-collision and other safety functions. Vehicles equipped with V2X/V2V onboard equipment will frequently (e.g. up to 20 times per second) transmit their vehicle information in packets referred to as Basic Safety Messages (BSM) or Cooperative Awareness Message (CAM). With all V2X equipped vehicles transmitting such BSM/CAM messages, all receiving vehicles have the information required to control their own speed and direction to avoid collisions and efficiently and safely position vehicles with respect to each other. It is envisioned that V2X equipped vehicles may be able to improve traffic flow by safely reducing separation distances, platooning several vehicles together, and avoiding vehicles experiencing breakdowns.

In V2X communications, it is important that inaccurate, corrupted, or hacked (i.e., bad) data is detected in order to prevent such inaccurate data from further dissemination. However, as an increasing number of vehicles are equipped to participate in such networks, the volume of potential misbehavior condition data is large and growing at an exponential rate. Management of such detected misbehavior conditions may be controlled in order to effectively utilize V2X messaging. Misbehavior detection systems are important to perform the function of detection of bad data as well as the generation of misbehavior reports (MBR). Currently, however, misbehavior detection systems process all received messages, even from a reported misbehaving sending device (referred to herein generally as an "ITS station"). This behavior consumes finite computing resources. For example, a misbehaving station can send up to 10-20 messages per second, requiring a misbehavior detection system to process this volume of such messages in addition to other messages received by the V2X system.

A local misbehavior detection system may send MBRs to a network security function, such as a Misbehavior Authority, but a process of revoking a certificate of a misbehaving ITS station may take hours or days. For example, for each confirmed misbehaving ITS station (which may require the receipt of several MBRs), the Misbehavior Authority may revoke a certificate of the misbehaving ITS station. The Misbehavior Authority may send a list of revoked ITS stations to other participating devices in the communication network, such as a Certificate Revocation List (CRL), that includes one or more identifiers of revoked ITS stations. However, as noted above, this process of revocation may take hours or days. Before the certificate revocation is completed, a misbehaving ITS station may send numerous incorrect or malicious V2X messages (e.g., up to a message every 100 milliseconds). Latency of communications with the Misbehavior Authority may be caused or exacerbated by an absence of connectivity with the Misbehavior Authority, a lack of connected infrastructure (related to DSRC), a lack of cellular connectivity (related to C-V2X), and a lack of evidence that the ITS station is misbehaving.

Various embodiments include methods and V2X processing devices configured to perform the methods of local misbehavior management. In some embodiments, a V2X processing device (e.g., of V2X onboard equipment) may add a station identifier associated with a V2X message having a detected misbehavior condition to a local blocking list in response to detecting a misbehavior condition in the V2X message. In some embodiments, the station identifier may include any unique identifier of an ITS station. In some embodiments, the station identifier may include a certificate or certificate number. In some embodiments, the station identifier may include a pseudonym certificate, an authorization ticket (e.g., delivered by V2X Public Key Infrastructure (PKI), a Media Access Control (MAC) address, or other suitable information.

In various embodiments, the local blocking list may be updated using locally-detected information, such as ITS station misbehavior, and station identifier associated with the misbehaving ITS station. In some embodiments, the local blocking list also may include information provided by a misbehavior authority, such as station identifiers provided in a CRL. In various embodiments, the CRL is a global blocking list set by the misbehavior authority based on the processing of misbehavior reports sent by numerous ITS stations. As such, the CRL represents a more global blocking list. In some embodiments, the V2X processing device may update the local blocking list using local information (i.e., based on ITS station misbehavior detected locally by the V2X processing device) and using "global" information received in a CRL or other suitable information from a misbehavior authority or entity.

In some embodiments, the V2X processing device may include hardware, software, or a combination of hardware and software that instantiates functions for systems for local misbehavior detection, local misbehavior reporting, and local misbehavior filtering or "prevention." The local misbehavior detection system may detect a V2X message that includes incorrect or spurious information. The local misbehavior detection system may determine whether the incorrect information is unintentional (e.g., incorrect information reported by a malfunctioning sensor) or intentional (e.g., malicious information, or information provided by a V2X device that has been hacked). The local misbehavior reporting system may generate and send a misbehavior report (MBR) indicating the detected misbehavior, e.g., to a misbehavior managing entity. The local misbehavior reporting system may also send an MBR to the local misbehavior prevention system.

In some embodiments, the local misbehavior prevention system may perform a filtering or firewall function to prevent a V2X message having a detected misbehavior condition from being further processed by the local misbehavior detection system. In some embodiments, the local misbehavior prevention system may be configured with a local blocking list. The local blocking list may include station identifiers of ITS stations that have sent an incorrect or spurious V2X message. In this manner, the V2X processing device may be configured to determine whether a station identifier associated with a received V2X message is present in the local blocking list, and whether to block the V2X message from further processing in response to determining that the station identifier associated with the another received V2X message is present in the local blocking list. In some embodiments, the V2X processing device may add the station identifier associated with the V2X message having the detected misbehavior condition to the local blocking list upon transmitting the misbehavior report to the management entity. In some embodiments, the V2X processing device may determine whether to add to the local blocking list the station identifier associated with the V2X message having the detected misbehavior condition.

In some embodiments, the V2X processing device may determine a type of misbehavior associated with the station identifier that is present in the local blocking list. For example, the V2X processing device may determine whether the misbehavior is unintentional (e.g., resulting from a malfunctioning device or sensor) or intentional (e.g., the result of an attack or intentional injection of incorrect or false information). In some embodiments, the V2X processing device may determine a blocking time period based on the type of misbehavior, and may block the V2X message from further processing for the blocking time period. For example, the V2X processing device may determine a relatively short time period, or may impose a temporary block, against V2X messages from an ITS sender for unintentional misbehavior. In some embodiments, the V2X processing device may determine a relatively long time period or impose a permanent block against V2X messages from an ITS sender for intentional misbehavior.

In some embodiments, the V2X processing device may update the local blocking list based on subsequent information, such as a certificate revocation list (CRL) received from the misbehavior managing entity. In some embodiments, the CRL may include one or more station identifiers of ITS stations whose certificate(s) have been revoked. As noted above, the misbehavior managing entity may provide the CRL hours or days after a misbehaving ITS station is reported. To address this, various embodiments enable the V2X processing device to act quickly to locally block V2X messages from misbehaving ITS stations by updating the local blocking list, and to later update the local blocking list based information eventually provided by the misbehavior managing entity in the CRL (or other information or message). In some embodiments, the V2X processing device may remove from the local blocking list one or more station identifiers that are not present in the CRL. For example, an ITS station with a malfunctioning sensor that is quickly repaired may not appear on the CRL since the certificate of this ITS station has not been revoked. As another example, the V2X processing device may retain on the local blocking list, or add to the local blocking list, one or more station identifiers that are present in the CRL. In some embodiments, the V2X processing device may increase a blocking time period for a station identifier that is present in the CRL (for example, to impose a permanent block on such station identifier).

Various embodiment may improve the operations of a V2X processing system by reducing a demand on V2X processing system resources by reducing the number or volume of invalid or inaccurate messages processed by the V2X processing system that are received from a misbehaving ITS station. Various embodiments improve the operations of a V2X processing system by enabling the V2X processing system to respond rapidly and dynamically to detected misbehavior from an ITS station, long before a misbehavior managing entity can respond to reports of such misbehavior. Various embodiments improve the operations of a V2X processing system by imposing a blocking time that may vary in duration based on different types of misbehavior conditions, and may avoid long term blocking (e.g., several days or weeks) ITS stations for unintentional misbehavior that can be fixed in a relatively short term (e.g., hours).

For ease of reference, some of the embodiments are described in this application using a Misbehavior Management System operating within vehicle-to-everything (V2X) terminologies. However, it should be understood that various embodiments encompass any or all of the V2X or vehicle-based communication standards, messages or technologies. As such, nothing in the application should be construed to limit the claims to V2X and Basic Safety Message (BSM) unless expressly recited as such in the claims. In addition, the embodiments described herein discuss onboard equipment to perform V2X communication. Other embodiments are contemplated in which the V2X communication may also include mobile devices, mobile computers and road side units (RSU) equipped to monitor road and vehicle conditions as well as participate in V2X communications.

Figure 1B:
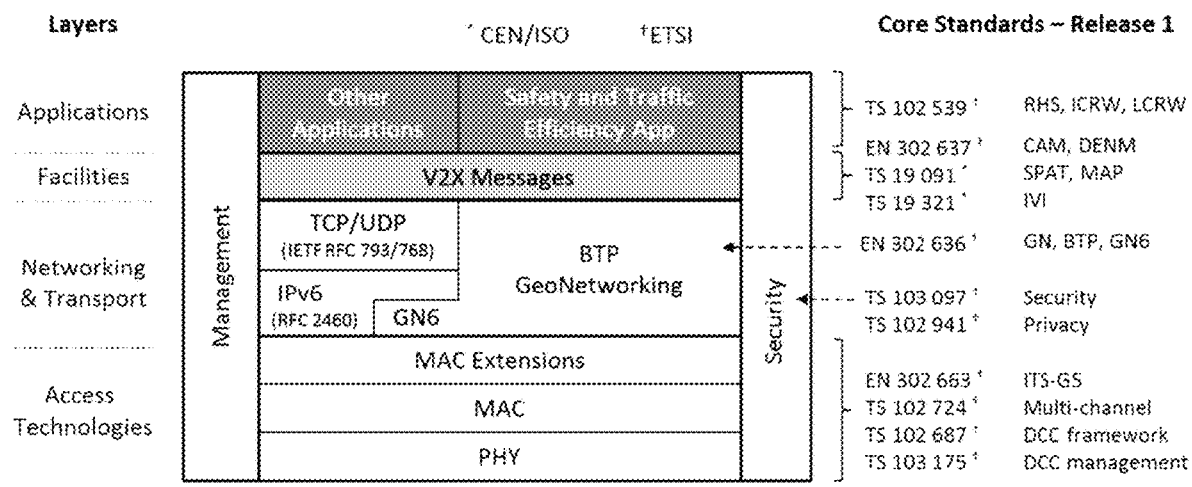
FIG. 1B is a conceptual diagram illustrating an example V2X communication protocol stack suitable for implementing various embodiments

To aid in describing the problem addressed by various embodiments, FIG. 1A illustrates a portion of the V2X system 100 including three vehicles, 12, 14, 16. FIG. 1B illustrates an example V2X communication protocol stack 150 suitable for implementing various embodiments. With reference to FIGS. 1A and 1B, each vehicle 12, 14, 16 includes a vehicle processing system (e.g., V2X onboard equipment) 102, 104, 106, respectively, that are configured to periodically broadcast Basic Safety Messages 112, 114, 116 for receipt and processing by other vehicles' onboard equipment (e.g., 102, 104, 106). By sharing the vehicle location, speed, direction, braking, and other information, vehicles can maintain safe separation and identify and avoid potential collisions. For example, a trailing vehicle 12 receiving Basic Safety Messages 114 from a leading vehicle 16 can determine the speed and location of the vehicle 16, enabling vehicle 12 to match the speed and maintain a safe separation distance 20. By being informed through Basic Safety Messages 114 when the leading vehicles 16 applies the brakes, the V2X equipment 102 in the trailing vehicle 12 can apply brakes simultaneously to maintain the safe separation distance 20 even when the leading vehicle 16 stopped suddenly. As another example, the V2X equipment 104 within the truck vehicle 14 may receive Basic Safety Messages 112, 116 from the two vehicles 12, 16, and thus be informed that the truck vehicle 14 should stop at the intersection to avoid a collision. Each of the vehicle V2X on-board equipment 102, 104, 106 may communicate with one another using any of a variety close proximity communication protocols. In addition, the vehicles may be able to transmit data and information regarding detected Basic Safety Messages as well as detected misbehavior reports to an original equipment manufacturer (OEM) (132, 134) and/or remote misbehavior managing authority 136 via communication links 122, 124 through a communication network 18 (e.g., cellular, WiFi, etc.) The MBR may be transmitted directly to the misbehavior managing authority 136 (e.g., through communication link 146). In other embodiments, the MBR may first be transmitted to a MBR pre-processing unit such as the OEM servers 132, 134 for pre-processing through communication links 122, 124. Then the pre-processed MBR may be transmitted from the MBR pre-processing 132, 134 to the misbehavior managing authority 136 through communication links 142, 144.

Given the criticality of Basic Safety Messages to the safe operation of surrounding vehicles, care should be taken to ensure that Basic Safety Messages are accurate and can be relied upon by other vehicles. One measure used to ensure reliability involves issuing certificates to each V2X onboard equipment that can be used to sign Basic Safety Messages. The certificate issued to V2X onboard equipment does not include a persistent identity for the V2X onboard equipment, and for this reason is typically referred to as a Pseudonym Certificate. A Misbehavior Management System operating within the V2X onboard equipment in nearby vehicles and highway monitoring systems of a basic safety podcast can confirm the authenticity of the V2X onboard equipment issuing the Basic Safety Message by verifying the signature on the broadcast messages. V2X onboard equipment receiving a Basic Safety Message can verify the signature using a public key. To guard against hacking or interference with the V2X system operations, V2X onboard equipment may be configured to ignore any received Basic Safety Message that has been signed using an expired or invalid certificate.

While signing Basic Safety Messages using the certificate issued to V2X onboard equipment guards against attempts to inject false Basic Safety Messages, the signature verification process may not detect when inaccurate Basic Safety Messages are generated by malfunctioning V2X onboard equipment using a legitimate certificate. Various equipment malfunctions may cause a V2X onboard equipment to produce incorrect Basic Safety Messages. For example, faults in navigation sensors, speed sensors, and/or cabling from such sensors to the V2X onboard equipment may result in inaccurate reporting of vehicle position (e.g., in an incorrect lane or larger error) or speed. It is also possible that a V2X onboard equipment may be maliciously altered to produce incorrect Basic Safety Messages that are signed using a legitimate certificate. Both cases are referred to as misbehavior.

In many cases, a receiving Misbehavior Management System may detect the misbehavior via misbehavior detection in onboard processing. Incorrect Basic Safety Messages may be recognized by the Misbehavior Management System operating in other vehicles when information contained in such messages conflicts with trustworthy information available to the V2X onboard equipment. For example, a Misbehavior Management System may recognize that the position information in a received Basic Safety Message is incorrect when the reported location of the reporting vehicle overlaps with the position of the vehicle receiving the Basic Safety Message. As another example, a Misbehavior Management System may recognize that the velocity information in received Basic Safety Message is incorrect when the velocity is inconsistent with the velocity of the equipment's own vehicle and surrounding vehicles. Other methods of recognizing incorrect Basic Safety Messages may be used.

To ensure the integrity and reliability of the V2X systems, the Misbehavior Management System may be configured to inform other vehicles and highway systems or authorities of detected incorrect Basic Safety Messages by transmitting messages that notify other systems of the detected issues. In conventional systems, the receiving V2X onboard equipment may automatically produce a misbehavior report or Misbehavior Detection Report (MBR in the figures). Each MBR may include the Pseudonym Certificate of the misbehaving V2X onboard equipment that signed the incorrect Basic Safety Message. A Misbehavior Management System that detected the misbehavior may be configured to send the Misbehavior Detection Report to a specific network backend entity for processing, which is referred to herein as the Misbehavior Authority (MA) of an SCMS. The reporting V2X onboard equipment is typically configured by the OEM, so the Misbehavior Report Catcher is typically operated by, or on behalf of, the OEM of the reporting V2X onboard equipment.

Misbehavior detection reports may be collected by a misbehavior authority, which may be an entity run by any of a variety of parties, such as a government agency, an independent third-party agency or service provider, and/or an OEM. A misbehavior authority may be configured to take actions to protect the reliability and integrity of the V2X systems and equipment. For example, a misbehavior authority may blacklist the certificates of misbehaving V2X onboard equipment so that other V2X onboard equipment can know to ignore Basic Safety Messages containing blacklisted certificates. Decentralized misbehavior authorities may also inform certificate registration authorities of certificates so that appropriate actions can be taken by the corresponding Registration Authority.

The term misbehaving V2X onboard equipment is used herein for the V2X onboard equipment to which misbehavior is attributed to in a Misbehavior Detection Report. However, in some cases another component or entity, and not the attributed V2X onboard equipment, could be misbehaving using messages or credentials obtained from the V2X onboard equipment. For example, a faulty sensor or equipment in the same vehicle as the attributed V2X onboard equipment may be the cause of erroneous information in a Basic Safety Message resulting in a misbehavior detection, although there are other scenarios in which an entity outside the vehicle may be responsible for transmission of incorrect Basic Safety Messages.

An entity, such as an OEM, may use of MBRs for a variety of reasons. For example, an OEM of an V2X onboard equipment may be interested in seeing information regarding the MBRs for misbehavior attributed to that V2X onboard equipment. In some cases, the OEM may want the information purely for recording statistics. In other cases, the OEM may take appropriate steps including, but not limited to, any of the following: attempting to fix errors in the V2X onboard equipment implementation; replacing the V2X onboard equipment; disabling the V2X onboard equipment; notifying the owner that the vehicle should be brought in for maintenance; deleting certificates from the V2X onboard equipment; placing some of the V2X onboard equipment certificates on a revocation list; issuing new certificates to the V2X onboard equipment. The OEM may perform such operations over the air in some cases, while physical access to the V2X onboard equipment is required in other cases.

As more and more vehicles are equipped with V2X equipment, the volume of possible detected misbehaviors is growing at an exponential rate. If a misbehavior report is to be generated in response to every detected misbehavior, the OEM and/or any misbehavior authority will be overwhelmed with MBRs. Thus, it may be necessary to manage whether to generate MBRs each time a misbehavior condition is detected. Moreover, in instances in which a Misbehavior Management System operating within the V2X equipment determines to the generate an MBR, the Misbehavior Management System may need to manage whether to store the MBR and/or whether to transmit the MBR to a managing authority in a SCMS. As the Misbehavior Management System becomes more sophisticated, the Misbehavior Management System may receive feedback from the misbehavior managing authority that provides the Misbehavior Management System with feedback that may allow the Misbehavior Management System to refine and improve the management of the misbehavior events. In particular, the feedback may allow the Misbehavior Management System to refine instances in which to generate a MBR in response to detecting a misbehavior, storing the generated MBR and/or transmitting the MBR to a misbehavior managing authority.

In V2X communication, it is beneficial to detect bad data to prevent spread of useless data among vehicles. Misbehavior detection system plays this role and, as a reaction after detection, can generate misbehavior reports (MBR). MBRs may need to be generated, stored locally, and transmitted to a trusted third party for investigation (e.g., Misbehavior Authority in SCMS). The rules for generation, storage and transmission are not trivial and may be defined such that utility is maximized and overhead minimized. For example, a misbehavior detection system shouldn't generate a MBR for every single misbehavior of the same type coming from the same remote vehicle but could create one report and append an "occurrence" value. This would save generation time (and I/O operations), local storage space, and decrease the number of MBR to transmit and to be checked by the MA. The ITS community is lacking such set of rules/algorithms for MBR management.

Various embodiments disclosed herein provide methods and mechanisms for managing MBRs. The various embodiments may determine instances in which it is appropriate to generate a misbehavior report when a misbehavior condition is detected. The various embodiments may also determine when it is appropriate to store the generated misbehavior report when a misbehavior report is generated. The various embodiments may also determine when it is appropriate to delete a misbehavior report that was previous stored. The various embodiments may also determine when it is appropriate to transmit a misbehavior report to a managing authority. In order to more efficiently utilize the information in the misbehavior report, some embodiments may preprocess the data contained in the misbehavior report.

Various embodiments may include operations to receive feedback from managing authorities in order to modify or optimize the management of misbehavior reports.

The various embodiment Misbehavior Management System may be deployed on any device capable of receiving directly or indirectly V2X messages. Thus, the various embodiments disclosed herein may work in an onboard unit mounted within a vehicle, in smartphone, roadside unit, or even in the cloud, to name a few.

In order provide context and background for the various embodiments, the following background on the IEEE 1609 misbehavior report processing system is provided. The following description is high level and provided primarily to explain the roles of various authorities and functionalities envisioned for interactions between various entities with V2X onboard equipment. Various embodiments are not limited to the following misbehavior report management processes.

The sending V2X equipment (e.g., on-board unit (OBU), RSU, ASD) may detect misbehavior conditions and determine whether to generate, store, and/or transmit misbehavior reports to a misbehavior managing authority (MA) that may also provide such reports to an SCMS. In order to authenticate misbehavior conditions, misbehavior reports, and Basic Safety Messages, each sending V2X equipment may attach a public key signature to each misbehavior conditions, misbehavior reports, and Basic Safety Messages, which can be verified by the public signing key in a Pseudonym Certificate which has been issued to the sending V2X onboard equipment.

Figure 2A:
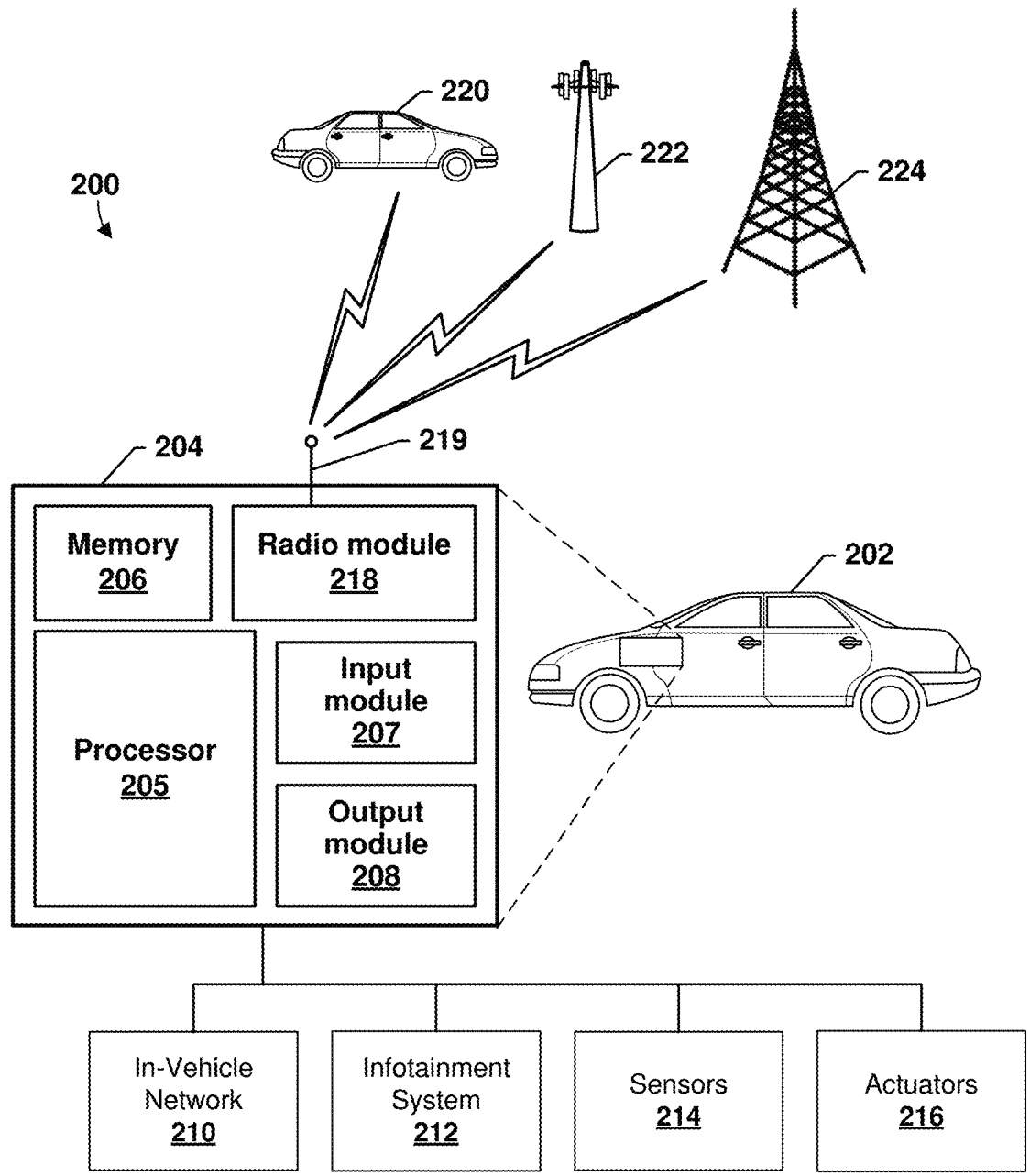
FIG. 2A is a component diagram illustrating an example vehicle system suitable for implementing various embodiments.
Figure 2B:
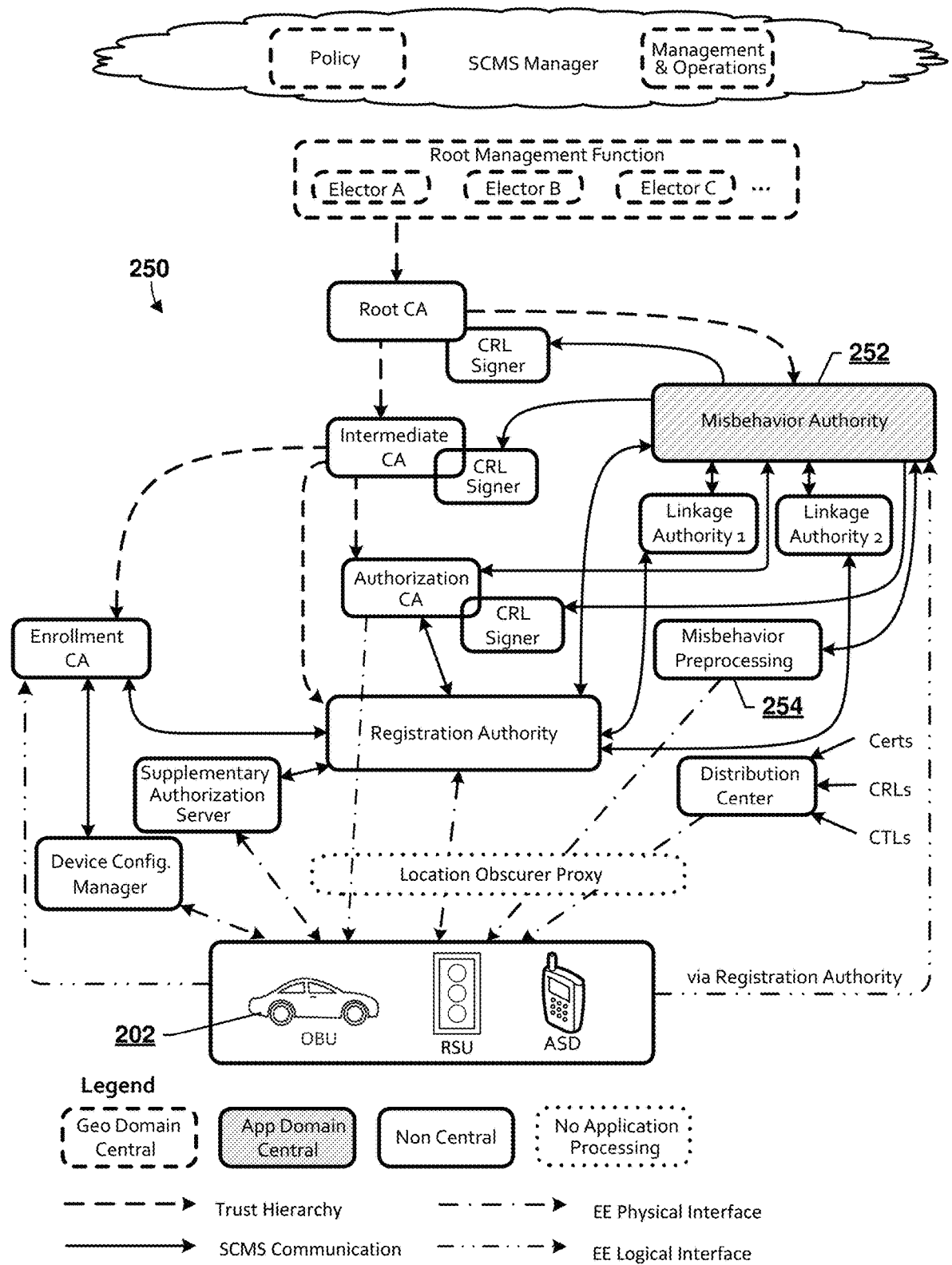
FIG. 2B is a component diagram illustrating a misbehavior management network suitable for implementing various embodiments.

FIG. 2A is a component diagram of an example vehicle system 200 suitable for implementing various embodiments. FIG. 2B is a component diagram illustrating a misbehavior management network 250 suitable for implementing various embodiments. With reference to FIGS. 1A-2B, the system 200 may include a vehicle 202 that includes a vehicle processing system 204 (for example, a telematics control unit or on-board unit (TCU/OBU)). In some embodiments, the system 200 may operate within, as a part of, and/or in the context of the misbehavior management network 250 that includes a misbehavior authority 252, as well as an element or functionality providing misbehavior preprocessing 254. The V2X processing device 202 may communicate with various systems and devices, such as an in-vehicle network 210, an infotainment system 212, various sensors 214, various actuators 216, and a radio module 218. The V2X processing device 202 also may communicate with various other vehicles 220, roadside units 222, base stations 224, and other external devices. The vehicle processing system 204 may be configured to perform operations for authenticating plaintext and ciphertext as further described below.

The vehicle processing device 204 may include a processor 205, memory 206, an input module 207, an output module 208 and the radio module 218. The processor 205 may be coupled to the memory 206 (i.e., a non-transitory storage medium), and may be configured with processor-executable instructions stored in the memory 206 to perform operations of the methods according to various embodiments described herein. Also, the processor 205 may be coupled to the output module 208, which may control in-vehicle displays, and to the input module 207 to receive information from vehicle sensors as well as driver inputs.

The vehicle processing system 204 may include a V2X antenna 219 coupled to the radio module 218 that is configured to communicate with one or more ITS stations such as another vehicle 220, a roadside unit 222, and a base station 224 or another suitable network access point. In various embodiments, the V2X processing device 202 may receive information from a plurality of information sources, such as the in-vehicle network 210, infotainment system 212, various sensors 214, various actuators 216, and the radio module 218. The V2X processing device 202 may detect a misbehavior condition in a system of the vehicle, such as one of the plurality of information sources 210-218, an application or service executing on the V2X processing device 202, or another system of the vehicle.

Examples of an in-vehicle network include a Controller Area Network (CAN), a Local Interconnect Network (LIN), a network using the FlexRay protocol, a Media Oriented Systems Transport (MOST) network, and an Automotive Ethernet network. Examples of vehicles sensors include a location determining system (such as a Global Navigation Satellite Systems (GNSS) system), a camera, radar, lidar, ultrasonic sensors, infrared sensors, and other suitable sensor devices and systems. Examples of vehicle actuators include various physical control systems such as for steering, brakes, engine operation, lights, directional signals, and the like.

Figure 3:
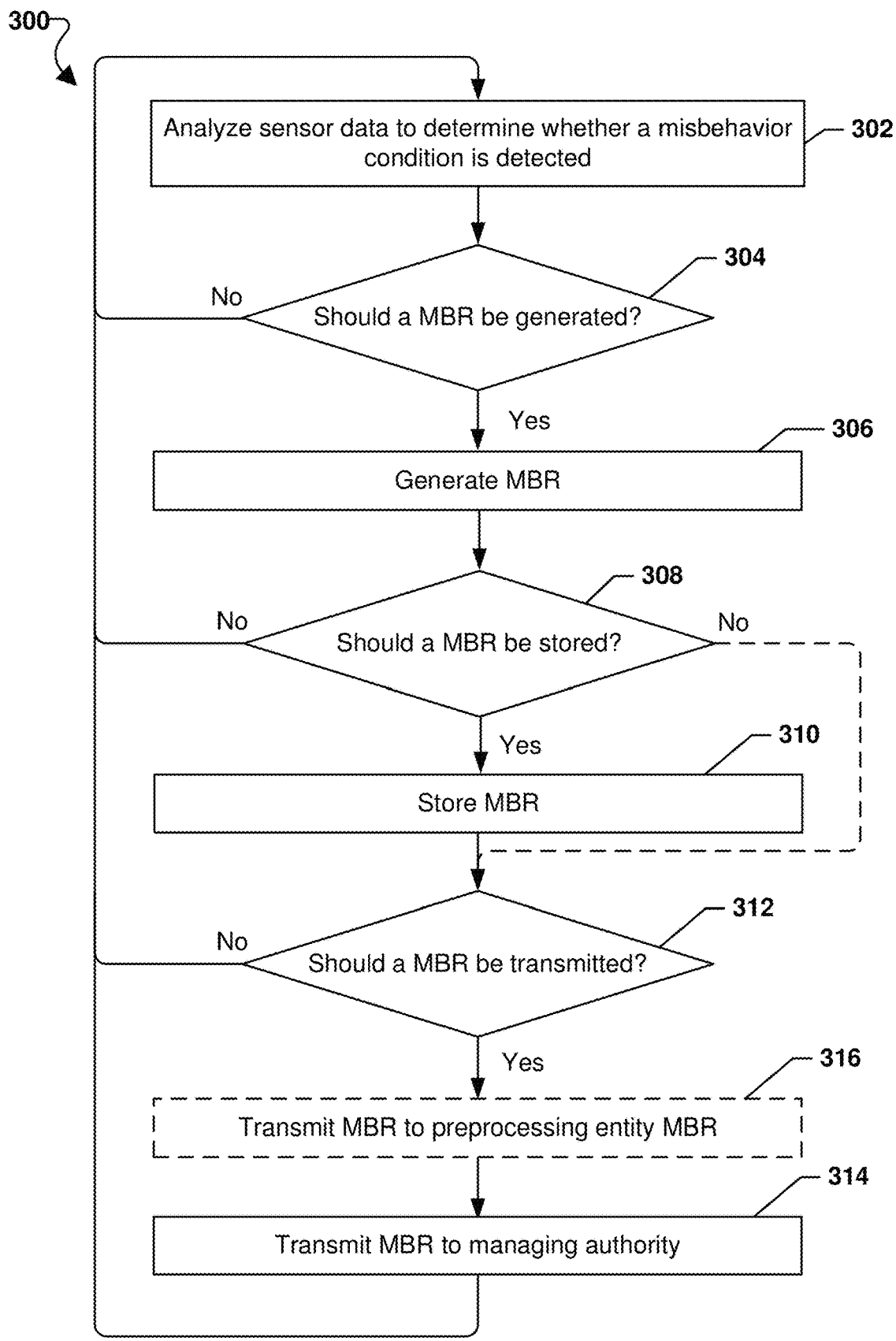
FIG. 3 is a process flow diagram illustrating an example method of managing the generation, storage and transmission of MBRs by a Misbehavior Management System.

FIG. 3 is a process flow diagram illustrating an example method 300 of managing the generation, storage and transmission of MBRs by a Misbehavior Management System. With reference to FIGS. 1A-3, the operations of the method 300 may be performed by a processor of a vehicle processing system (e.g., 102, 104, 106, 204).

In various embodiments, the method 300 includes operations involved in managing the generation, storage, and transmission of misbehavior reports that may be performed by misbehavior management system of V2X equipment and/or a misbehavior managing authority.

In block 302, the misbehavior management system included in on-board V2X equipment (e.g., 102, 104, 106) may analyze (e.g., monitor and analyze) various sensor data of their respective vehicles (e.g., 12, 14, 16) to determine whether a misbehavior condition is detected. In some embodiments, the V2X equipment may also include roadside units and/or other mobile units that may be able to monitor and observe the behavior of other respective vehicles to determine whether a misbehavior condition exists. For example, the V2X equipment may receive a Basic Safety Message from another vehicle that is inconsistent with the observations that the V2X equipment may make of other vehicles. As an example, the V2X equipment 102 on-board in vehicle 12 may receive a basic safety message (BSM) from the V2X equipment 106 on-board in vehicle 16 that vehicle 16 is initiating an emergency braking operation. However, the misbehavior management system of V2X equipment 102 on-board in vehicle 12 may observe that vehicle 16 is not decelerating or applying an emergency brake. In such situations, the V2X equipment 106 on-board in vehicle 16 may detect a misbehavior condition as the BSM that an emergency braking operation is occurring is inconsistent with other sensor data that the misbehavior management system of V2X equipment 106 on-board in vehicle 16 is monitoring. In addition, the misbehavior management system of V2X equipment 102 on-board in vehicle 12 that receives the BSM from the Misbehavior management V2X equipment 106 on-board in vehicle 16 may also detect a misbehavior condition, as the BSM received from the V2X equipment 106 on-board in vehicle 16 is inconsistent with the observations made by the V2X equipment 102 on-board in vehicle 12. Means for performing the operations of block 302 may include the vehicle processing system 102, 104, 106, 204, processor 205, radio module 218, and sensors 214.

In determination block 304, the processor may determine whether a misbehavior report should be generated. In various embodiments, while both the V2X equipment 106 on-board in vehicle 16 as well as the V2X equipment 102 on-board in vehicle 12 may detect a misbehavior condition, each V2X equipment 102, 106 may make a determination whether a misbehavior report should be generated, and if so, what evidence to collect and append to the generated misbehavior report. The decision to generate a misbehavior report after detecting a misbehavior condition may be based on a number of factors. For example, as discussed in more detail below with reference to FIGS. 4A and 4B, the decision to generate a misbehavior report may be based on the (i) seriousness of the misbehavior detected (due to potential safety impact, or level of potential road traffic disruption), (ii) length of observed misbehavior (this helps differentiating transient fault to persistent misbehavior), (iii) number of times the remote vehicle has been detected as misbehaving (i.e. this helps covering sporadic misbehavior), (iv) number of neighboring vehicles (with different certificate) detected as performing similar misbehavior (this helps aggregating and reporting a larger issue), or (v) simply after at least one detector was triggered. Means for performing the operations of determination block 304 may include the vehicle processing system 102, 104, 106, 204, and the processor 205.

In response to determining that a misbehavior report should be generated (i.e., determination block 304="Yes"), the processor may generate a misbehavior report in block 306. Means for performing the operations of block 306 may include the vehicle processing system 102, 104, 106, 204, and the processor 205.

In determination block 308, the processor may determine whether the misbehavior report should be stored in memory. The decision to store a misbehavior report after the report is generated may be based on a plurality of criteria. As discussed in more detail below with reference to FIGS. 5A and 5B, the decision to store the generated misbehavior report may depend on a plurality of criteria that may include: (i) the confidence level of detection of misbehavior condition, (ii) the determined message set size (e.g. misbehavior detected but requires a certain number of messages from neighboring devices), (iii) the determined storage required for blacklisting approach (note that storing a hash of the remote vehicle certificate in a counting Bloom filter (or Cuckoo filter) would work), (iv) whether a network connection to SCMS/PKI available. Means for performing the operations of determination block 308 may include the vehicle processing system 102, 104, 106, 204, and the processor 205.

In response to determining that a misbehavior report should not be generated (i.e., determination block 308="No"), the processor may again analyze (i.e., monitor and analyze) sensor data to determine whether a misbehavior condition is detected in block 302 as described.

In response to determining that a misbehavior report should be stored (i.e., determination block 308="Yes"), the processor may store the misbehavior report in a memory storage of the misbehavior management system in block 310. Means for performing the operations of determination block 308 may include the vehicle processing system 102, 104, 106, 204, the processor 205, and the memory 206.

Upon storage of the misbehavior report (MBR) in block 310 and/or optionally in response to determining that a misbehavior report should not be generated (i.e., determination block 308="No"), the processor may determine whether the generated misbehavior report should be transmitted to a misbehavior managing authority (e.g., 252) in determination block 312. Means for performing the operations of determination block 312 may include the vehicle processing system 102, 104, 106, 204, and the processor 205.

In response to determining that a misbehavior report should not be stored (i.e., determination block 312="No"), the processor may analyze (i.e., monitor and analyze) sensor data to determine whether a misbehavior condition is detected in block 302 as described.

In some embodiments, as noted above, even if the misbehavior management system determines that a misbehavior report should not be stored (i.e., determination block 308="No"), the processor may optionally determine whether to transmit the misbehavior report to a misbehavior managing authority in determination block 312).

In response to determining that the misbehavior report should be transmitted (i.e., determination block 312="Yes"), the processor may transmit the misbehavior report to a misbehavior managing authority in block 314. Means for performing the operations of block 314 may include the vehicle processing system 102, 104, 106, 204, the processor 205, and the radio module 218. The processor may then analyze (i.e., monitor and analyze) sensor data to determine whether a misbehavior condition is detected in block 302 as described.

In various embodiments, after MBR generation in block 306, the processor may determine whether to store the MBR in local memory in determination block 308, or determine whether to transmit the MBR in determination block 312, or whether to both store the MBR in local memory and transmit the MBR. In some situations, the vehicle may not have network connectivity to transmit its MBR(s) and hence may store generated MBR(s) locally. The decision to store the MBRs may depend on a plurality of factors, including whether: (i) misbehavior is detected but with low confidence (which may allow for collection of more evidence and increased certainty), (ii) detectors require a larger message set (e.g. misbehavior may be detected when a certain number of messages are received from neighboring devices), (iii) storage is required for a blacklisting approach (which may store a hash of the remote vehicle certificate in a counting Bloom filter or Cuckoo filter), and/or (iv) there is no network connection to the SCMS/PKI available for transmitting MBRs.

In some embodiments, the misbehavior management system may use artificial intelligence, neural network and/or machine learning techniques (referred to herein generally as a "machine learning model") to detect the occurrence of a misbehavior condition. A machine learning model may be used by the misbehavior management system to analyze a copious amount of data from a large number of sensors and data sources to obtain an indication or probability of whether a misbehavior condition exists. In embodiments in which the misbehavior management system uses a machine learning model to detect misbehavior conditions, the misbehavior management system may generate an MBR that includes information about and/or generated by the machine learning model. This may reduce the amount of data to contained in an MBR, stored with the MBR, and/or transmitted in the compared to including all data related to or characterizing the detected misbehavior condition. Thus, in embodiments in which the misbehavior management system uses a machine learning model to detect misbehavior conditions, the misbehavior management system may be configured to generate a misbehavior report that includes one or more of: the machine learning model; an output of the machine learning model; a principal component analysis of the machine learning model; an intermediate representation of the machine learning model; or an identifier of the machine learning model. In embodiments in which the misbehavior report includes an identifier of the machine learning model, the misbehavior managing system operating on the V2X equipment and the misbehavior managing authority may have previously shared machine learning models and agreed on an index value.

In addition, in embodiments in which there may be a number of stored misbehavior reports, the misbehavior management system may the priority order in which the MBRs are transmitted. For example, the priority order may be based on the calculated weight for each MBR (i.e. highest priority first). As discussed in more detail below with reference to FIG. 6, the MBRs may be assigned a weight that may vary depending on the relative age of the MBR. If competing MBRs have the same calculated weight value, the stored order of the MBR may be used to determine the transmission priority order. For example, a first in-first out (FIFO) or last in-first out (LIFO) scheme may be used, or if the calculated weight is disassociated from a classification or seriousness of the underlying misbehavior condition, the assigned classification or seriousness value may be used as a priority order parameter.

Another transmission priority rule may be a "fairness" rule in which an ego vehicle may transmit a MBR that reports on its neighboring vehicles (i.e., vehicles with different IDs). This transmission priority rule may ensure that an ego vehicle does not only report one specific neighboring vehicle all the time. The fairness may be implemented using round-robin scheduling technique. For example, an ego vehicle may detect misbehavior conditions occurring within itself as well as misbehavior conditions occurring in neighboring vehicles. With reference to FIG. 1, a vehicle 12 (ego vehicle) may detect misbehavior conditions that occur within the vehicle 12 as well as misbehavior conditions occurring in vehicles 14 and 16. The misbehavior management system operating within the V2X equipment 102 may generate a series of MBRs related to the misbehavior conditions occurring in each of vehicle 12, vehicle 14 and vehicle 16. In an example, the misbehavior management system operating within the V2X equipment 102 may generate three (3) separate MBRs related to misbehaviors occurring within each of vehicles 12, vehicle 14 and vehicle 16. The MBRs may be identified as $MBR_{12-1}$, $MBR_{12-2}$, $MBR_{12-3}$, $MBR_{14-1}$, $MBR_{14-2}$, $MBR_{14-3}$, $MBR_{16-1}$, $MBR_{16-2}$, and $MBR_{16-3}$. Embodiments that implement a "fairness" rule may ensure that the MBRs related to each different vehicle are equally reported within a given uplink budget. Thus, the reports may be transmitted in an order such as $MBR_{12-1}$, $MBR_{14-1}$, $MBR_{16-1}$, $MBR_{12-2}$, $MBR_{14-2}$, $MBR_{16-2}$, $MBR_{12-3}$, $MBR_{14-3}$, and $MBR_{16-3}$.

The generated MBRs may be transmitted to a central "Misbehavior Managing Authority" (MA) which processes the MBRs. The Misbehavior Managing Authority may perform further analysis on the MBRs and decide which enforcement activities to carry out based on the analysis. In conventional MBR management systems, the Misbehavior Managing Authority may not possess good knowledge regarding the trustworthiness of the received MBRs or about their capabilities, because the reporting MBR management systems may not want to reveal proprietary information about their capabilities or what they've observed, and because cryptographic overhead and processing redundant data may be a burden on the Misbehavior Managing Authority. In some embodiments, the MBR may be transmitted to a Misbehavior Preprocessing entity (e.g., 254) (also called Misbehavior Processor—shortened MBRPre) in optional block 316, for preprocessing before being sent to the managing authority (e.g., Misbehavior Managing Authority (MA)). For example, the MBRPre (e.g., 132, 134) may be the OEM (for reports received from vehicles), or the mobile network operator (for reports received from smartphones). In some embodiments, the MBRPre may have an individual relationship with (e.g., may be associated with) the V2X equipment 102, 104, 106 and may be trusted by the central misbehavior managing authority 136. This relationship may enable the MBR processor (e.g., 132, 134) to update misbehavior managing systems operating within the V2X equipment so that the misbehavior managing systems operating on the V2X equipment may send proprietary format MBRs to their MBPre (e.g., 132, 134). This relationship also may allow the MBPres to update the misbehavior report format, or to create aggregate or statistical reports, as well as potentially forwarding the original report material.

For example, an on-board equipment (e.g., 102, 104, 106) within a vehicle 12, 14, 16 may detect a position overlap misbehavior when two neighboring vehicles equipped with V2X are observed with overlapping locations. The vehicle's OEM may be aware of a faulty GNSS receiver and hence may disregard or drop the MBR resulting from this detected condition in order to avoid sending faulty MBRs to the central misbehavior managing authority. As another example, if the OEM know that the GNSS is not faulty, the OEM could augment the MBR with telematics data to provide richer evidence to the misbehavior managing authority (e.g., 136).

Figure 4A:
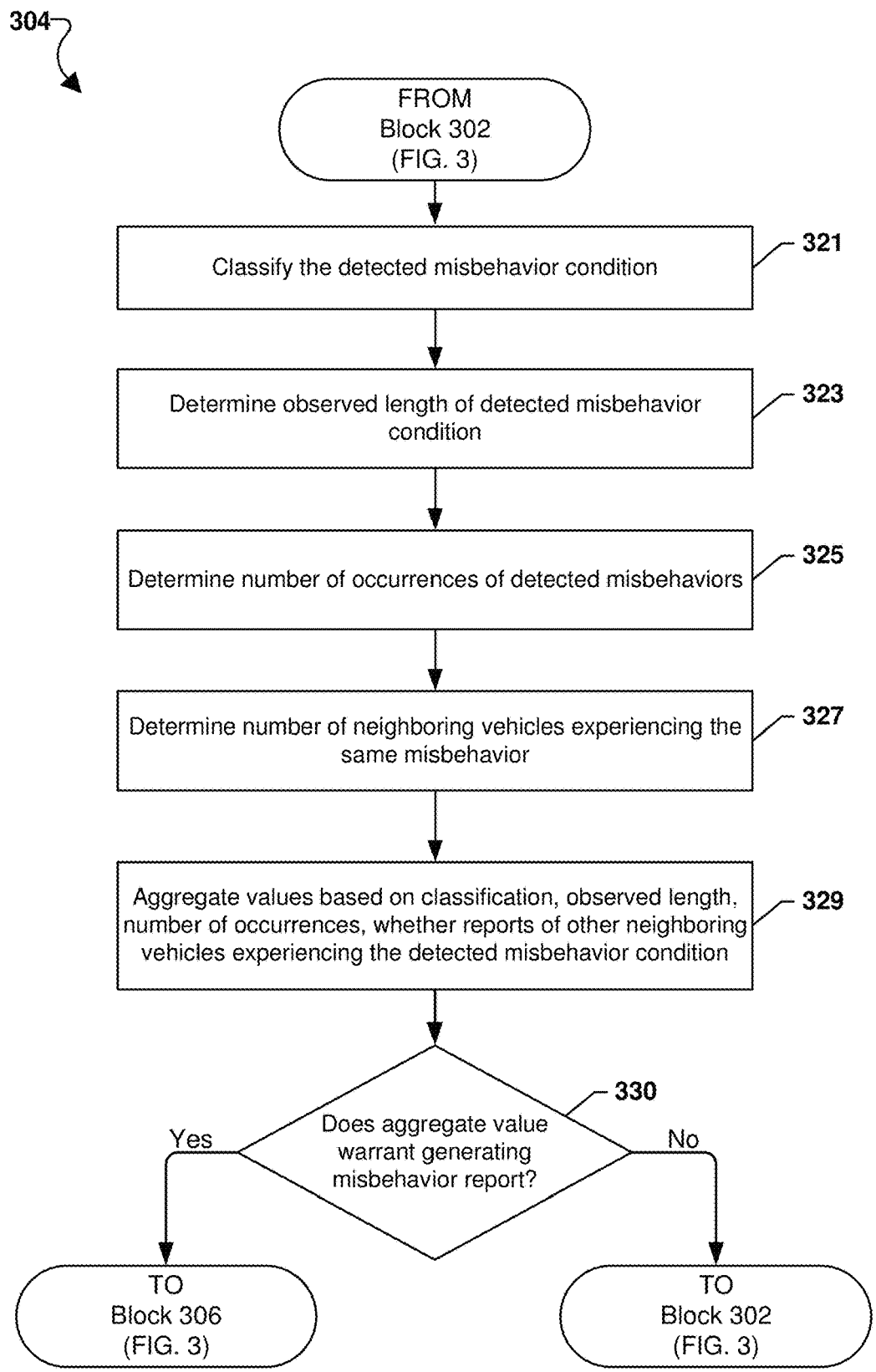
FIGS. 4A and 4B are process flow diagrams illustrating example operations for determining whether to generate misbehavior reports by a Misbehavior Management System.
Figure 4B:
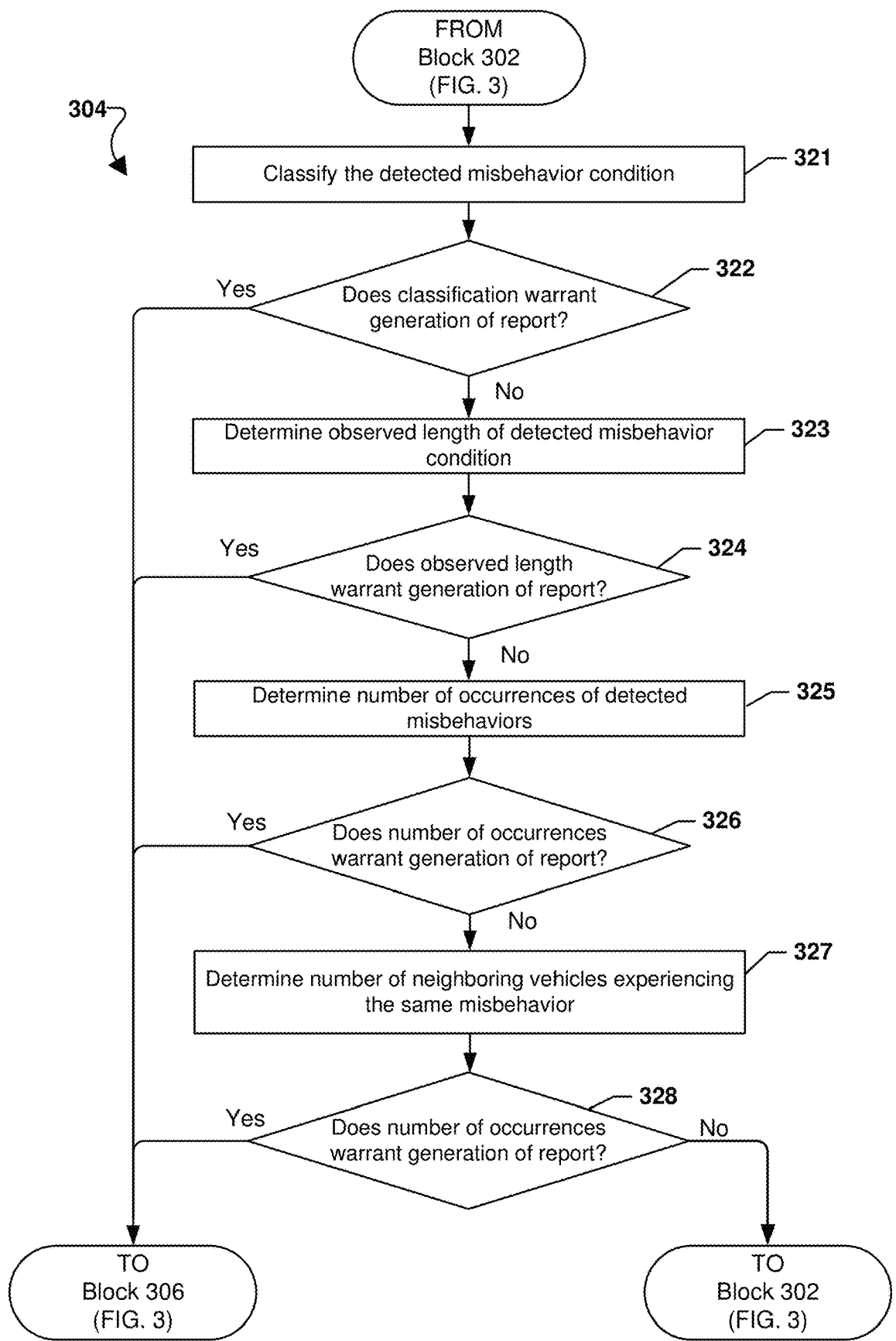

FIGS. 4A and 4B are process flow diagrams illustrating example operations for determining whether a misbehavior report should be generated that may be performed as part of the method 300. With reference to FIGS. 1A-4B, the operations may be performed by a processor of a vehicle processing system (e.g., 102, 104, 106, 204).

With reference to FIG. 4A, after the misbehavior management system detects that a misbehavior condition has occurred in block 302, the misbehavior management system may classify the detected misbehavior condition in block 321. For example, the misbehavior condition may be classified into one of two categories, such as a misbehavior that is related to a potential safety issue or a misbehavior that is related to potential road traffic disruption. An appropriate value may be assigned to the misbehavior condition to identify it as either misbehavior that is related to a potential safety issue or a misbehavior that is related to potential road traffic disruption. Means for performing the operations of block 321 may include the vehicle processing system 102, 104, 106, 204, and the processor 205.

For example, the misbehavior management system of the V2X equipment 102 on-board in vehicle 12 may receive a basic safety message (BSM) from the V2X equipment 106 on-board in vehicle 16 that vehicle 16 is initiating an emergency braking operation. However, other sensor data as well as the observations made by other external V2X equipment such as in other vehicles or roadside units may contradict the emergency braking operation. Such a misbehavior condition could cause other vehicles to unnecessarily perform a sudden braking operation that leads to an accident. Thus, the misbehavior condition may be classified as being related to a potential safety issue.

In another example, a vehicle's global positioning system (GPS) may erroneously calculate the vehicle's position. By calculating the vehicle's position erroneously, a particular road/street may erroneously report more vehicle's traveling on the road/street than are actually traveling on the road/street. Such an erroneous report may be related to potential road traffic disruption. Still further the erroneously calculated vehicle location may be related to a potential safety issue. For example, if the vehicle GPS erroneously calculates and reports the vehicle's position to be in the wrong lane of travel (i.e., on the wrong side of the road/street), other vehicles may be directed to take evasive maneuvers to avoid the "phantom" vehicle that erroneously reports its location. This could lead to a potential safety issue.

While in some embodiments, misbehavior conditions may be classified as either misbehavior that is related to a potential safety issue or a misbehavior that is related to potential road traffic disruption, in other embodiments, the misbehavior condition may be assigned a value on a singular sliding scale. For example, misbehavior conditions that are related to safety issues that may result in serious harm may be assigned a high value. Misbehavior conditions that are related only to road traffic disruptions may be assigned a low value. Other misbehavior conditions that may be related to both potential safety issue and related to potential road traffic disruption may be assigned an intermediate value based on the misbehavior condition's relative potential harm vis-a-vis inconvenience.

In block 323, the processor may determine the observed length of the misbehavior condition and assign a value based on the observed length. As an example, in some instances, the misbehavior condition may be a temporary anomaly causing the detected misbehavior. However, in other instances the misbehavior condition may be persistent. For example, if a misbehavior condition only occurs for a short period of time in a particular location, it may be evidence of a malicious hack in a particular area that impacts vehicles traveling in a particular area. In contrast, a persistent misbehavior may be a result of a faulty sensor that continually reports erroneous data. Whether a misbehavior condition is short in duration or long in duration may be significant to a MBR management system. Depending on how the misbehavior management system decides to respond to the observed length of the misbehavior condition (i.e., long vs. short) may be subjective. In either case, the observed length of the detected misbehavior may be assigned a value for consideration into whether to generate a MBR or not. Means for performing the operations of block 323 may include the vehicle processing system 102, 104, 106, 204, and the processor 205.

In block 325, the processor may determine the number of occurrence of detected misbehaviors and assign a value based on the number of occurrences of the detected misbehavior. For example, it the misbehavior management system detects the same misbehavior consistent repeatedly, it may indicate that a sensor requires repair or replacement. Therefore, multiple of occurrences of the detected misbehavior condition may be assigned a value (higher or lower) that may result in a determination that a MBR is generated. Means for performing the operations of block 325 may include the vehicle processing system 102, 104, 106, 204, and the processor 205.

In block 327, the processor may determine the number of neighboring vehicles experiences the misbehavior. As discussed in the example above, the misbehavior management system of the V2X equipment 102 on-board in vehicle 12 may receive a basic safety message (BSM) from the V2X equipment 106 on-board in vehicle 16 that vehicle 16 is initiating an emergency braking operation. However, other sensor data as well as the observations made by other external V2X equipment such as in other vehicles or roadside units may contradict the emergency braking operation. The misbehavior management system of vehicle 12 may receive V2X communications from the misbehavior management system of the V2X equipment 106 on board vehicle 16 informing the V2X equipment 102 on-board in vehicle 12 of the observations made by the V2X equipment 106 on board vehicle 16. Such indications of neighboring vehicles on the same detected misbehavior condition may further support the confidence level of the misbehavior management system of vehicle 12 that the misbehavior condition was accurately detected. Such indications from neighboring vehicles may be recorded and added as evidence of the detection of the misbehavior condition. The misbehavior management system may assign a value to the misbehavior condition based on the number of neighboring vehicles experiencing the same misbehavior. For example, a higher number of other neighboring vehicles experiencing the same misbehavior may boost the confidence that the misbehavior condition is accurately detected. Means for performing the operations of block 327 may include the vehicle processing system 102, 104, 106, 204, and the processor 205.

In block 329, the processor may aggregate the values that are assigned by the processor based on the classification of the detected misbehavior condition (e.g., in the operations of block 321), the observed length of the detected misbehavior (e.g., in the operations of block 323), the number of occurrences of the detected misbehaviors (e.g., in the operations of block 325), and the number of neighboring vehicles that experience the misbehavior condition (e.g., in the operations of block 327) to calculate an aggregated value for the detected misbehavior condition. Means for performing the operations of block 329 may include the vehicle processing system 102, 104, 106, 204, and the processor 205.

In determination block 330, the processor may determine whether the aggregated value exceeds a threshold value. Means for performing the operations of determination block 330 may include the vehicle processing system 102, 104, 106, 204, and the processor 205.

In response to determining that the aggregated value exceeds the threshold value (i.e., determination block 330="Yes"), the processor may generate an MBR may be generated in block 306 as described.

In response to determining that the aggregated value does not exceed a threshold value (i.e., determination block 330="No"), the processor may analyze (i.e., monitor and analyze) sensor data to determine whether a misbehavior condition is detected in block 302 as described.

In some embodiments, the values assigned to each of the criteria used to determine whether to generate a MBR may be lower values for more serious conditions that warrant the generation of an MBR. In such embodiments, an aggregate value that is lower than a threshold value would exceed the threshold value. In other embodiments, the values assigned to each of the criteria used to determine whether to generate a MBR may be higher values for more serious conditions that warrant the generation of an MBR. In such embodiments, an aggregate value that is higher than a threshold value would exceed the threshold value.

FIG. 4B illustrates alternative operations that may be performed by a processor of a vehicle processing system (e.g., 102, 104, 106, 204) for determining whether to generate an MBR in determination block 304 (FIG. 3) in response to detection of a misbehavior condition. The processor may perform the operations of classifying the detected misbehavior condition in block 321, determining the observed length of the detected misbehavior in block 323, determining the number of occurrences of the detected misbehaviors in block 325, and determining the number of neighboring vehicles that experience the misbehavior condition in block 327) as described. Additionally, after performing the operations of each of blocks 321, 323, 325, and 327, the processor may determine whether the assigned value for each criteria exceeds a threshold value such that a MBR may be generated.

For example, after classifying the detected misbehavior condition in block 321 as described (which may include assigning a value based on the classification of the detected misbehavior condition), the processor may determine whether the assigned value exceeds a threshold in determination block 322. Means for performing the operations of determination block 322 may include the vehicle processing system 102, 104, 106, 204, and the processor 205.

In response to determining that the assigned value based on the classification exceeds a threshold (i.e., determination block 322="Yes"), the misbehavior management system may generate an MBR in block 306 as described. In response to determining that the value assigned based on the classification of the detected misbehavior does not exceed a threshold (i.e., determination block 322="No"), the processor may perform the operations of block 323 as described.

After determining the observed length of the detected misbehavior condition in block 323 (which may include assigning a value based on the observed length of the detected misbehavior condition), the processor may determine whether the assigned value based on the observed length exceeds a threshold in determination block 324. Means for performing the operations of determination block 324 may include the vehicle processing system 102, 104, 106, 204, and the processor 205.

In response to determining that the assigned value exceeds a threshold (i.e., determination block 324="Yes"), the processor may generate an MBR in block 306 as described.

In response to determining that the value assigned based on the observed length of the detected misbehavior does not exceed a threshold (i.e., determination 324="No"), the processor may perform the operations of block 325 as described.

After determining the number of occurrences of the detected misbehavior condition in block 325 (which may include assigning a value based on the number of occurrences of the detected misbehavior condition), the processor may determine whether the assigned value based on the number of occurrences exceeds a threshold in determination block 326. Means for performing the operations of determination block 326 may include the vehicle processing system 102, 104, 106, 204, and the processor 205.

In response to determining that the assigned value exceeds a threshold (i.e., determination block 326="Yes"), the processor may generate an MBR in block 306 as described.

In response to determining that the value assigned based on the number of occurrences of the detected misbehavior does not exceed a threshold (i.e., determination block 326="No"), the misbehavior management system may perform the operations of block 327 as described.

After determining the number of neighboring vehicles experiencing the same detected misbehavior condition in block 327 (which may include assigning a value based on the number of neighboring vehicles experiencing the same detected misbehavior condition), the processor may determine whether the assigned value based on the number of neighboring vehicles experiencing the same detected misbehavior condition exceeds a threshold in determination block 328. Means for performing the operations of determination block 328 may include the vehicle processing system 102, 104, 106, 204, and the processor 205.

In response to determining that the assigned value exceeds a threshold (i.e., determination block 328="Yes"), the processor may generate an MBR in block 306 as described.

In response to determining that the value assigned based on the number of neighboring vehicles experiencing the same detected misbehavior condition does not exceed a threshold (i.e., determination block 326="No"), the misbe-havior management system may analyze (e.g., monitor and analyze) various sensor data of their respective vehicles in block 302 as described.

Figure 5A:
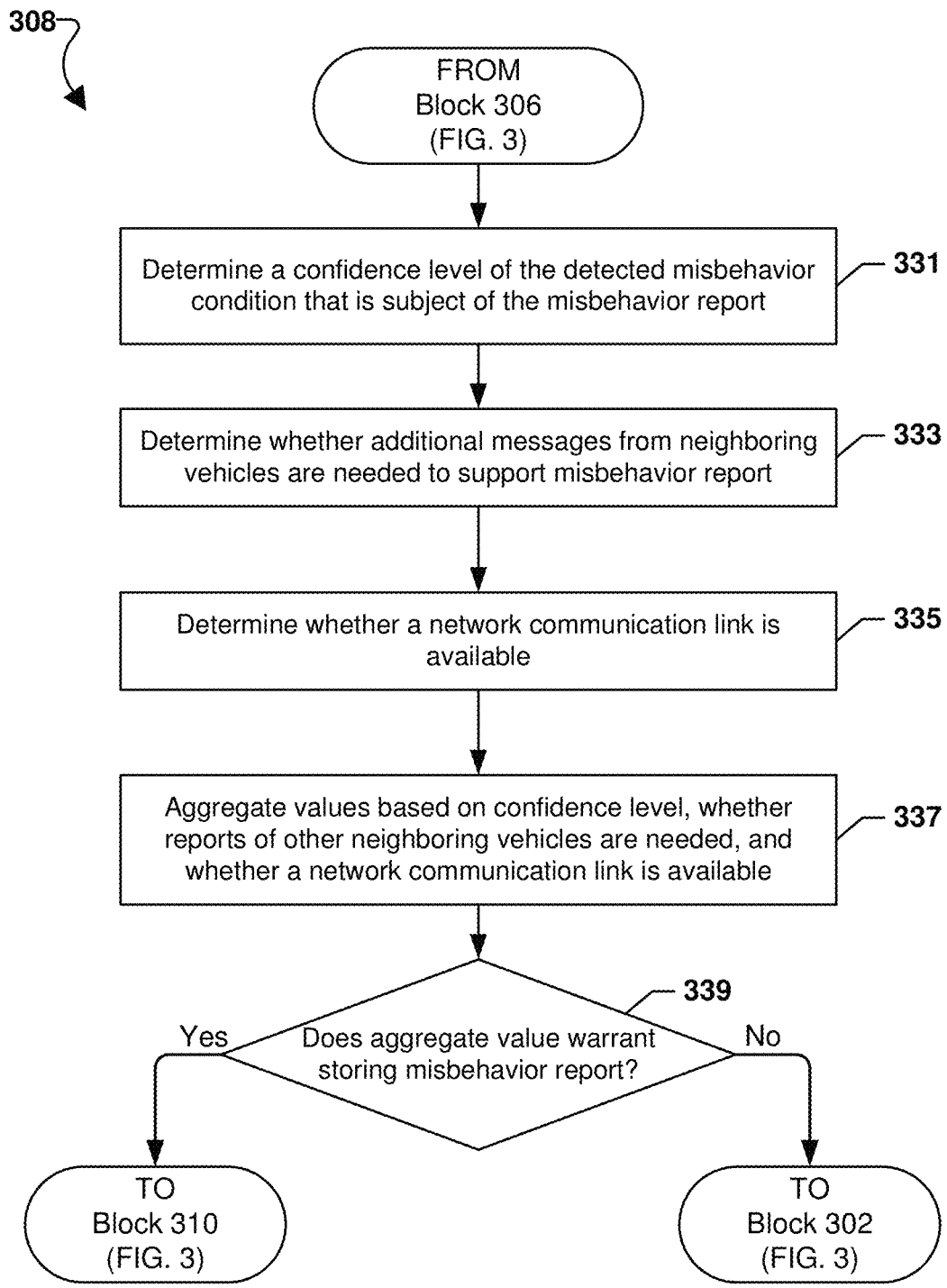
FIGS. 5A and 5B are process flow diagrams illustrating example operations for determining whether to store misbehavior reports by a Misbehavior Management System.
Figure 5B:
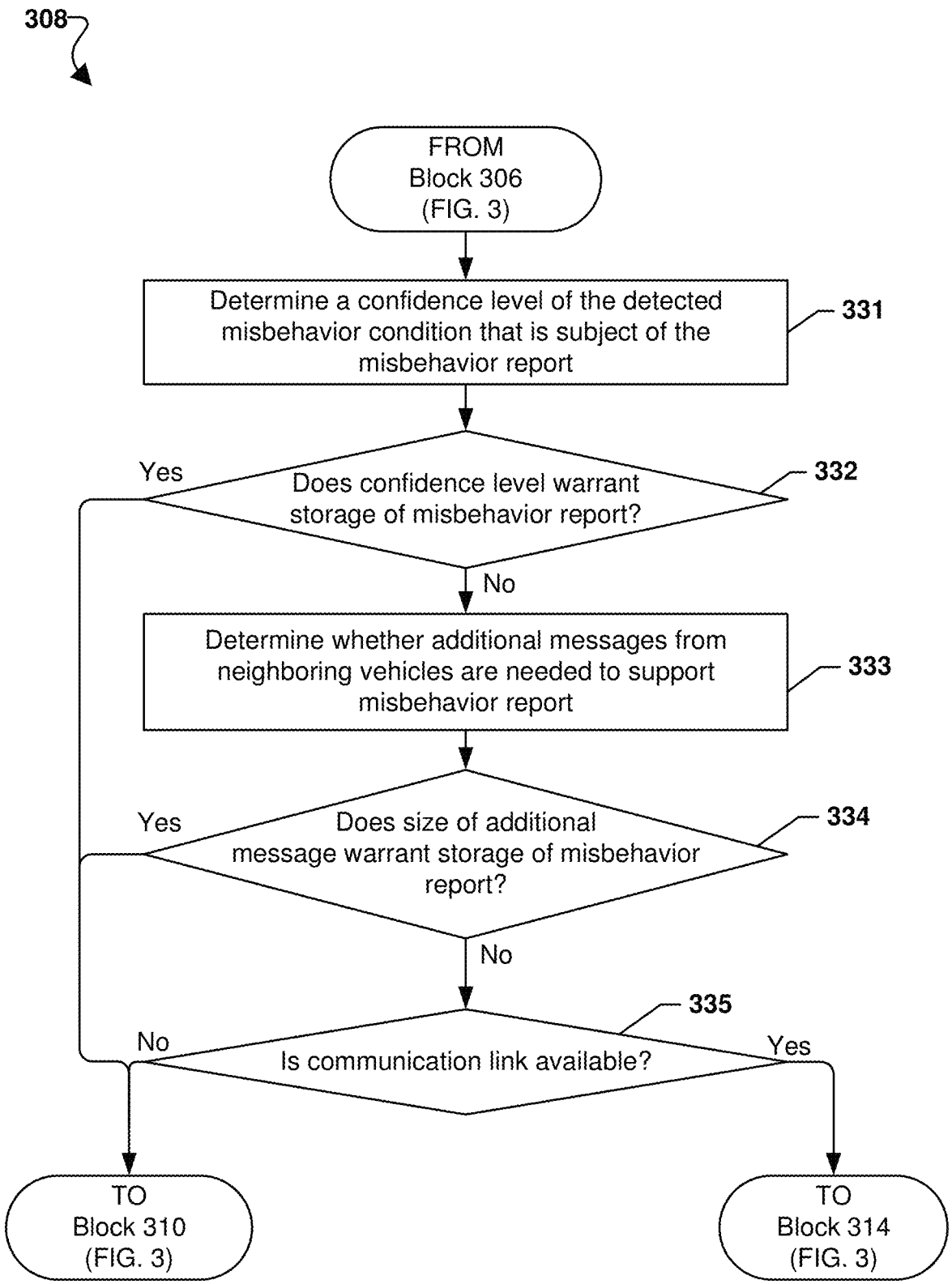

FIGS. 5A and 5B are process flow diagrams illustrating example operations for determining whether to store misbehavior reports by a Misbehavior Management System that may be performed as part of the method 300. With reference to FIGS. 1A-5B, the operations may be performed by a processor of a vehicle processing system (e.g., 102, 104, 106, 204).

Referring to FIG. 5A, after generating an MBR in block 306 as described, the processor may determine whether the MBR should be stored in memory. In light of limited memory capacity and the volume of potential misbehavior conditions that may be detected, the processor of the misbehavior management system may determine which of the generated MBR should be stored in memory. For example, in a manner similar to the determination of whether to generate a MBR for a detected misbehavior condition illustrated in FIG. 4A, the processor may review and determine a number of criteria related to the storage of a generated MBR and assign a value to the generated MBR for a particular criteria. In some embodiments, the processor may aggregate the assigned values and may determine whether the aggregated value exceeds a threshold. In response to determining that the aggregated value exceeds the threshold, the processor may store the generated MBR in block 310 as described.

For example, after generating an MBR in block 306 as described, the processor may determine a confidence level of the detected misbehavior condition that is the subject of the generated MBR in block 331. In various embodiments, the greater the number of data points used by the processor, the higher the confidence level of the detected misbehavior condition that the processor may determine. As an example, a number of neighboring vehicles may provide indications of their observations that a basic safety message (BSM) that is received from another vehicle is inaccurate. If a large number of neighboring vehicles provide observations (e.g., which may include supporting evidence) that a BSM is inaccurate, the confidence level that the misbehavior condition is detected may be relatively high. As another example, receiving conflicting sensor data from a vehicle's plurality of sensor may lead the processor to conclude that a misbehavior condition has occurred. As another example, if data from a particular sensor is a clear outlier (e.g., if an overwhelming number of other sensor data contradicts the data from that particular sensor) the processor may conclude with relative high confidence that a misbehavior condition has occurred. In various embodiments, such as in any of these examples, a confidence value may be assigned to the detected misbehavior condition. Means for performing the operations of block 331 may include the vehicle processing system 102, 104, 106, 204, and the processor 205.

In block 333, the processor may determine whether additional messages from neighboring vehicles are needed to support an MBR. In some embodiments, the processor may determine whether the processor has sufficient information available to evaluate the misbehavior report or whether further information is needed In some embodiments, the processor may determine a number of additional messages that may be needed to support an MBR (for example, to provide evidence of or examples for an MBR). For example, a processor may receive indications from neighboring vehicles that their respective observations contradict a BSM that was received from the initial vehicle. Each of these indications may support and bolster the confidence level that a misbehavior condition is accurately detected. However, each of these additional messages that are appended to the data that supports the MBR increases the size of the MBR that is to be stored, consuming valuable storage space. In some embodiments, the processor may balance the storage that may be consumed by additional data against the usefulness of the information in the additional data. In some embodiments, the processor may determine that such large MBR with additional messages from neighboring vehicles is too large to store (e.g., that a size of an MBR meets or exceeds a threshold). In some embodiments, such MBR may be assigned a value that may not support a determination to store the MBR because it is too large. However, in other embodiments, such MBRs with supporting evidence may be assigned a value that supports a greater likelihood that the MBR will be stored. Means for performing the operations of block 333 may include the vehicle processing system 102, 104, 106, 204, and the processor 205.

In block 335, the processor may determine whether a communication link to a misbehavior managing authority is available. For example, in instances where a communication link to a misbehavior managing authority is available, the processor may transmit the MBR to a remote misbehavior managing authority for analysis and storage in response to transmitting the MBR to the remote misbehavior managing authority, the processor may determine that it is unnecessary to store the MBR locally in the V2X equipment. Thus, the processor may assign a value to the MBR report that would support not storing the MBR locally when a communication link to a misbehavior managing authority is available. Means for performing the operations of block 335 may include the vehicle processing system 102, 104, 106, 204, and the processor 205.

In block 337, the processor may aggregate values based on the confidence level of the detected misbehavior condition (block 331), whether additional message are needed from neighboring vehicles and/or the number of messages needed from neighboring vehicles in block 333, and whether a communication link to a misbehavior managing authority is available in block 335 to calculate an aggregated value for the MBR. Means for performing the operations of block 337 may include the vehicle processing system 102, 104, 106, 204, and the processor 205.

In determination block 339, the processor may determine whether the aggregated value exceeds a threshold value (e.g., whether the aggregated value warrants storing the MBR).

In response to determining that the aggregate value warrants storing the MBR (e.g., in response to determining that the aggregate value exceeds the threshold) (i.e., determination block 339="Yes"), the processor may store the MBR in block 310 as described.

In response to determining that the aggregate value does not warrant storing the MBR (e.g., in response to determining that the aggregated value does not exceed a threshold value) (i.e., determination block 339="No"), the processor analyze (i.e., monitor and analyze) sensor data to determine whether a misbehavior condition is detected in block 302 as described.

In some embodiments, the values assigned to each of the criteria used to determine whether to store an MBR may be lower values for more serious conditions that warrant the storage of an MBR. In such embodiments, an aggregate value that is lower than a threshold value would exceed the threshold value. In some embodiments, the values assigned to each of the criteria used to determine whether to store an MBR may be higher values for more serious conditions that warrant the storage of an MBR. In such embodiments, an aggregate value that is higher than a threshold value would exceed the threshold value.

FIG. 5B illustrates alternative operations that may be performed by a processor of a vehicle processing system (e.g., 102, 104, 106, 204) for determining whether to store an MBR in determination block 308 (FIG. 3). The processor may perform the operations of determining confidence level of the detected misbehavior condition in block 331, determining the number of neighboring vehicles that experience the misbehavior condition in block 333, and determining whether a communication link to a misbehavior managing authority is available in block 335) as described. Additionally, after performing the operations of each of blocks 331, 333, 335, and 337, the processor may determine whether the assigned value for each criteria exceeds a threshold value such that a MBR may be stored.

For example, after determining confidence level of the detected misbehavior condition in block 331 as described (which may include assigning a value based on the confidence level of the detected misbehavior condition), the processor may determine whether the assigned value exceeds a threshold in determination block 332. Means for performing the operations of block 332 may include the vehicle processing system 102, 104, 106, 204, and the processor 205.

In response to determining that the assigned value based on the confidence level exceeds a threshold (i.e., determination 332="Yes"), the processor may store the MBR in local memory in block 310 as described.

In response to determining that the value assigned based on the classification of the detected misbehavior does not exceed a threshold (i.e., determination block 332="No"), the processor may perform the operations of block 333 as described.

After determining whether additional messages from neighboring vehicles are needed to support an MBR in block 333 (which may include assigning a value based on the number of neighboring vehicles that experience the detected misbehavior condition), the processor may determine whether the assigned value based on the number of neighboring vehicles exceeds a threshold in determination block 334. Means for performing the operations of determination block 334 may include the vehicle processing system 102, 104, 106, 204, and the processor 205.

In response to determining that the assigned value exceeds a threshold (i.e., determination 334="Yes"), the processor may store the MBR in local memory in block 310 as described.

In response to determining that the value assigned based on the number of neighboring vehicles does not exceed a threshold (i.e., determination block 334="No"), the processor may determine whether a communication link to a misbehavior managing authority is available in determination bock 335. Means for performing the operations of block 335 may include the vehicle processing system 102, 104, 106, 204, and the processor 205.

In response to determining that a communication link to a misbehavior managing authority is available (i.e., determination block 335="Yes"), the processor may transmit the MBR to the misbehavior managing authority in block 314 as described.

In response to determining that the communication link to a misbehavior managing authority is not available (i.e., determination block 335="No"), the processor may to store the MBR in local memory in block 310 as described.

In some embodiments, in addition to determining whether to store an MBR, the processor may determine whether to delete or flush stored MBRs from local storage to make room for more recently generated MBR. To facilitate this determination, the processor may assign a calculated weight to each stored MBR. Additionally or alternatively, the processor may use the calculated weight to determine a priority of transmission of a particular MBR. For example, in determination block 312, the processor may prioritize one stored MBR over another based on the respective assigned calculated weight of the stored MBRs.

Figure 6:
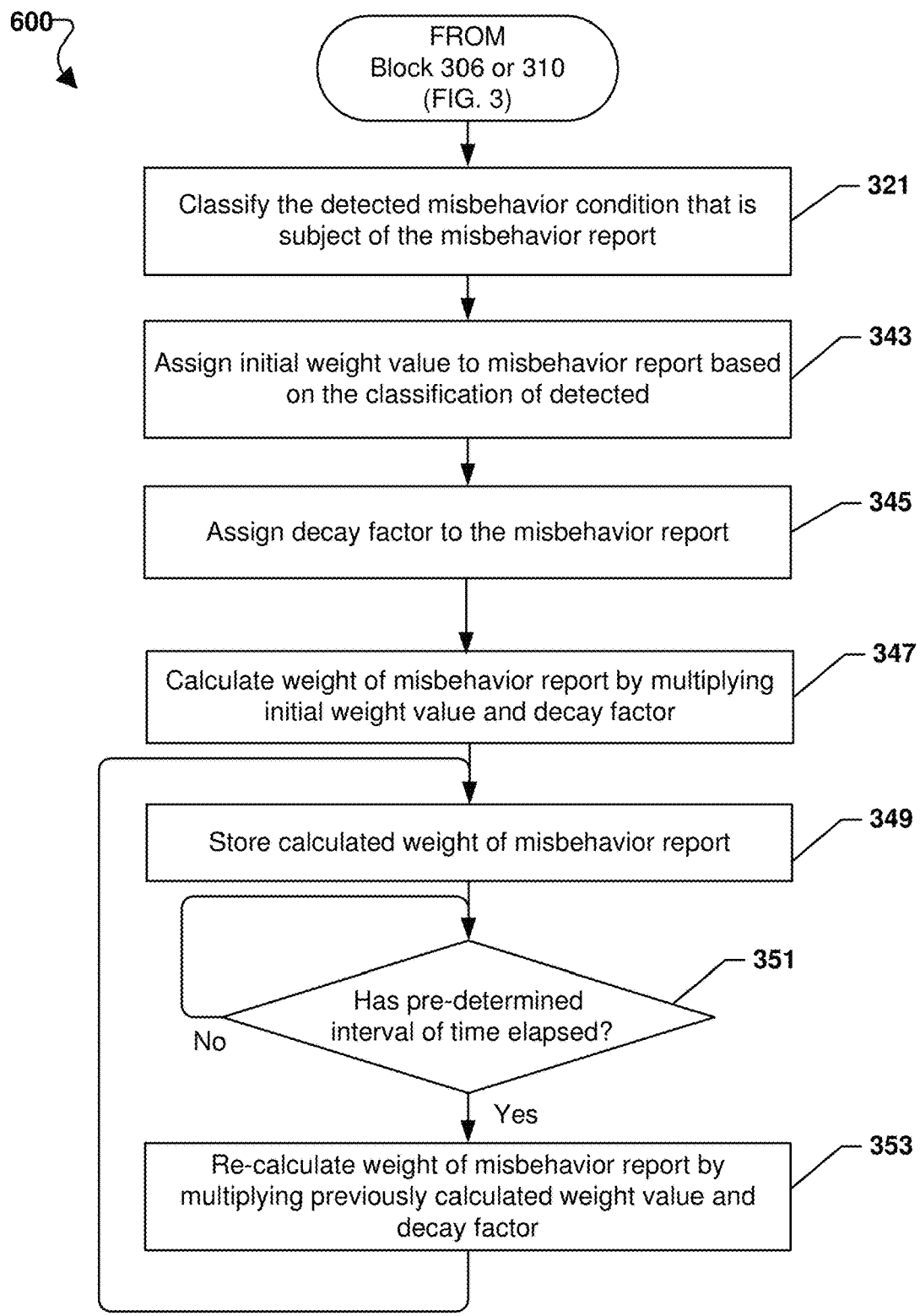
FIG. 6 is a process flow diagram illustrating example operations for calculating a weight of a generated misbehavior report by a Misbehavior Management System.

FIG. 6 is a process flow diagram illustrating example operations 600 for calculating a weight of a generated misbehavior report that may be performed as part of the method 300. With reference to FIGS. 1A-6, the operations 600 may be performed by a processor of a vehicle processing system (e.g., 102, 104, 106, 204).

In some embodiments, the processor may calculate a weight of an MBR after the MBR is generated or after the generated MBR is stored.

After generating a misbehavior report in block 306 as described, or after storing the MBR in memory in block 310 as described, the processor may classify the detected misbehavior condition that is the subject of the generated MBR in block 321 as described.

In block 343, the processor may assign an initial weight value to the misbehavior condition to identify the misbehavior condition as either a misbehavior that is related to a potential safety issue or a misbehavior that is related to potential road traffic disruption. While in some embodiments, misbehavior conditions may be classified as either misbehavior that is related to a potential safety issue or a misbehavior that is related to potential road traffic disruption, in other embodiments, the processor may assign an initial weight value on a sliding scale. For example, misbehavior conditions that are related to safety issues that may result in serious harm may be assigned a relatively high initial weight value, and misbehavior conditions that are related only to road traffic disruptions may be assigned a relatively low initial weight value. Other misbehavior conditions that may be related to both potential safety issue and related to potential road traffic disruption may be assigned an intermediate initial weight value based on the misbehavior condition's relative potential harm vis-a-vis inconvenience. Other factors may impact the assigned initial weight. For example, if multiple instances of the same misbehavior are observed from the same source, then each instance of the misbehavior may get weighted differently. In some embodiments, the initial weight may depend not just on the MBR classification but also on how severe the underlying misbehavior is, and/or based on how much it exceeds a reporting threshold. For example, in a case where yaw rate should be consistent with velocity and lateral acceleration, in response to determining an inconsistency of 25%, the processor may assign a higher initial weight than determined inconsistency of 5%. In some embodiments, the aggregate values that may be calculated (e.g., in the operations of block 329 (FIG. 4A) may be used as an assigned initial weight to the misbehavior condition. For example, the values assigned to a detected misbehavior condition by the processor may include values based on one or more of the classification of the detected misbehavior condition in block 321, the observed length of the detected misbehavior in block 323, the number of occurrences of the detected misbehaviors in block 325, and/or the number of neighboring vehicles that experience the misbehavior condition in block 327.

In block 345, the processor may assign a decay factor to the MBR. In some embodiments, the decay factor may be a value greater than 0 and less than 1 In some embodiments, the decay factor may be associated with a pre-determined time interval. For example, the pre-determined time interval may be hours, days, week, or a month. In some embodiments, a shorter pre-determined time interval may be required to generate a higher volume of MBRs. In other embodiments, a smaller decay factor may be used to decrease a number of viable MBRs for storage and/or transmission. In some embodiments, a combination of a shorter pre-determined time interval and a smaller decay factors may facilitate a decrease in the overall number of MBRs that are determined (identified, selected) by the processor for storage and/or transmission. Means for performing the operations of block 345 may include the vehicle processing system 102, 104, 106, 204, and the processor 205.

In block 347, the processor may calculate an initial weight of the MBR may be calculated by multiplying the assigned initial weight value of the MBR and the decay factor. Means for performing the operations of block 347 may include the vehicle processing system 102, 104, 106, 204, and the processor 205.

In block 349, the processor may store the calculated weight along with the associated MBR. In some embodiments, the processor may use a counter, timer, and/or clock to measure the pre-determined time interval. Means for performing the operations of block 349 may include the vehicle processing system 102, 104, 106, 204, and the processor 205.

In determination block 351, the processor may determine whether the pre-determined interval of time has elapsed. Means for performing the operations of block 351 may include the vehicle processing system 102, 104, 106, 204, and the processor 205.

In response to determining that the predetermined interval of time has not elapsed (i.e., determination block 351="No"), the processor may again determine whether the pre-determined interval of time has elapsed in determination block 351.

In response to determining that the predetermined interval of time has elapsed (i.e., determination block 351="Yes"), the processor may re-calculate a weight of an MBR in block 353. In some embodiments, in order to re-calculate the weight of the misbehavior report, the previously calculated weight value may be retrieved from storage and multiplied by the decay factor. Means for performing the operations of block 353 may include the vehicle processing system 102, 104, 106, 204, and the processor 205.

The misbehavior management system may again store the calculated weight along with the associated MBR in block 349 as described. In some embodiments, once the calculated weight or re-calculated weight value is stored, this value may be accessed by other processes/determinations as to whether to store, delete, and/or transmit the MBR based on the stored calculated weight value.

Figure 7:
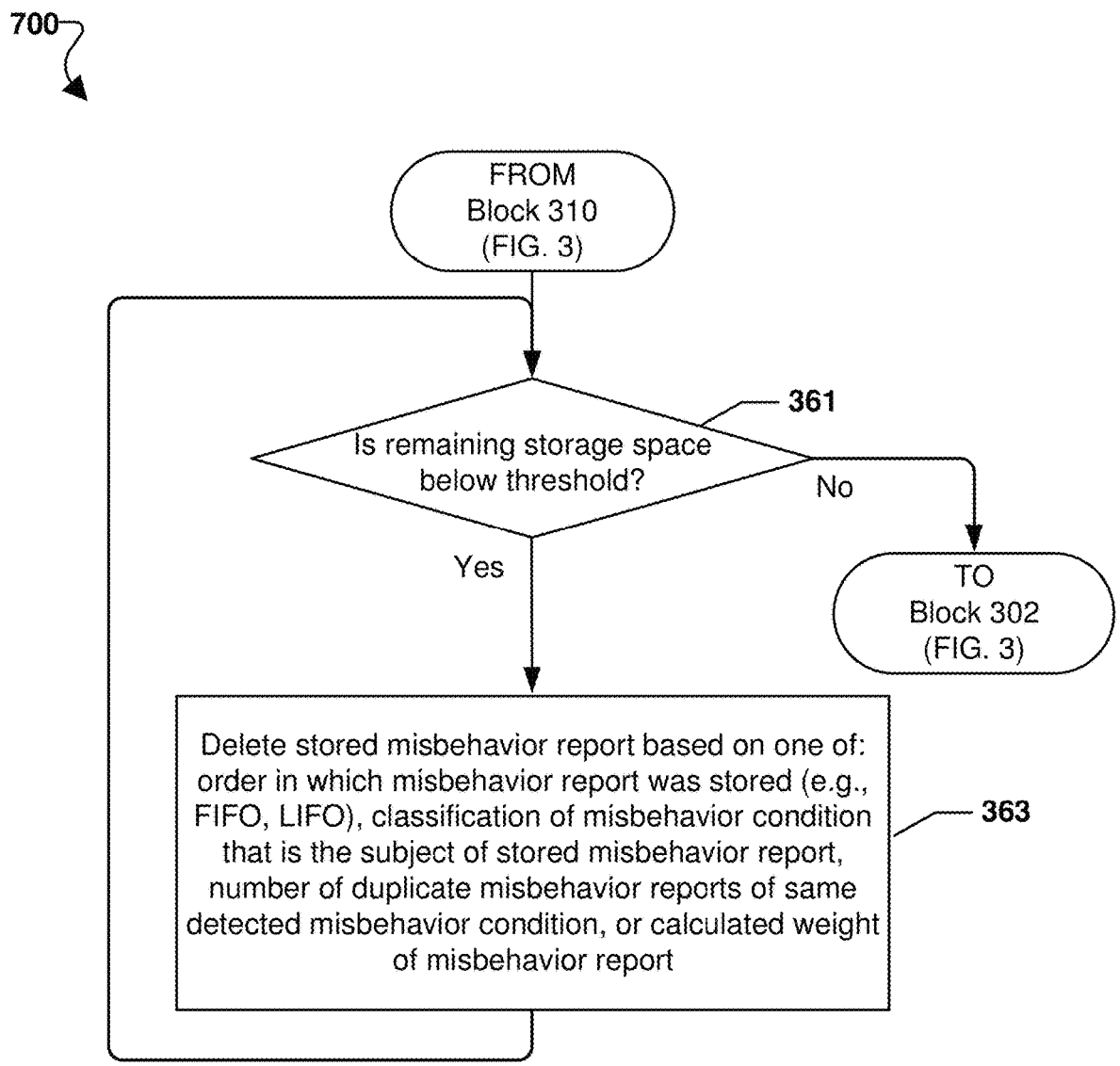
FIG. 7 is a process flow diagram illustrating example operations for determining which stored misbehavior report may be deleted by a Misbehavior Management System.

FIG. 7 is a process flow diagram illustrating example operations 700 for determining which stored misbehavior report may be deleted that may be performed as part of the method 300. With reference to FIGS. 1A-7, the operations 700 may be performed by a processor of a vehicle processing system (e.g., 102, 104, 106, 204). In some embodiments, the operations 700 include a flush/delete process that may utilize the calculated weight of the MBRs.

After an MBR is stored in block 310 as described, the processor may determine whether the remaining storage space is below a threshold amount in determination block 361. For example, the processor may audit the available remaining storage space in local memory.

In response to determining that the remaining storage space is below a threshold amount (i.e., determination block 361="Yes"), the processor may delete a stored MBR report in block 363. In some embodiments, the processor may delete one or more MBRs in a plurality of manners, for example: (i) first in, first out (FIFO), (ii) least serious/dangerous/disruptive first, (iii) duplicate first (assuming MBRs were generated to report the same senderID and same misbehavior—the system could aggregate MBRs prior to deletion of older duplicates), and/or (iv) based on individual current weight. In some embodiments, the processor may select an MBR for deletion based on one or more of order of storage (i.e., FIFO or LIFO), the classification type of the MBR, the number of MBR that report the same duplicate misbehavior condition, or a calculated weight of the misbehavior as was calculated (e.g., as part of the operations 600, FIG. 6). In some embodiments, the processor may select an MBR for deletion on a FIFO or LIFO scheme. In some embodiments, the processor may delete stored MBR such that only MBRs that report on inconvenience of potential traffic disruption are deleted. In this manner, any MBR related to safety issues are preserved. In some embodiments, the processor may delete reports that include duplicate misbehaviors. In some embodiments, the processor may aggregate values representing any and/or all of the above-described factors. In some embodiments, the processor may select (determine, identify) which MBR to delete based on the aggregate value of such factors. Means for performing the operations of block 363 may include the vehicle processing system 102, 104, 106, 204, and the processor 205.

In response to determining that the remaining storage space is above a threshold amount (i.e., determination block 361="No"), the processor may perform may analyze (e.g., monitor and analyze) various sensor data of their respective vehicles (e.g., 12, 14, 16) to determine whether a misbehavior condition is detected in block 302 as described.

In some embodiments, as an alternative to deleting MBRs, the processor may offload MBRs (i.e., move stored MBRs) to another storage or module (e.g. smartphone, edge device, other vehicles). In some embodiments, the processor may encrypt and/or electronically sign (i.e., generate an electronic signature over or based on an MBR) each MBR. In some embodiments, the processor may use such rules as deletion or transmission rules to determine or select an MBR for offload.

Figure 8:
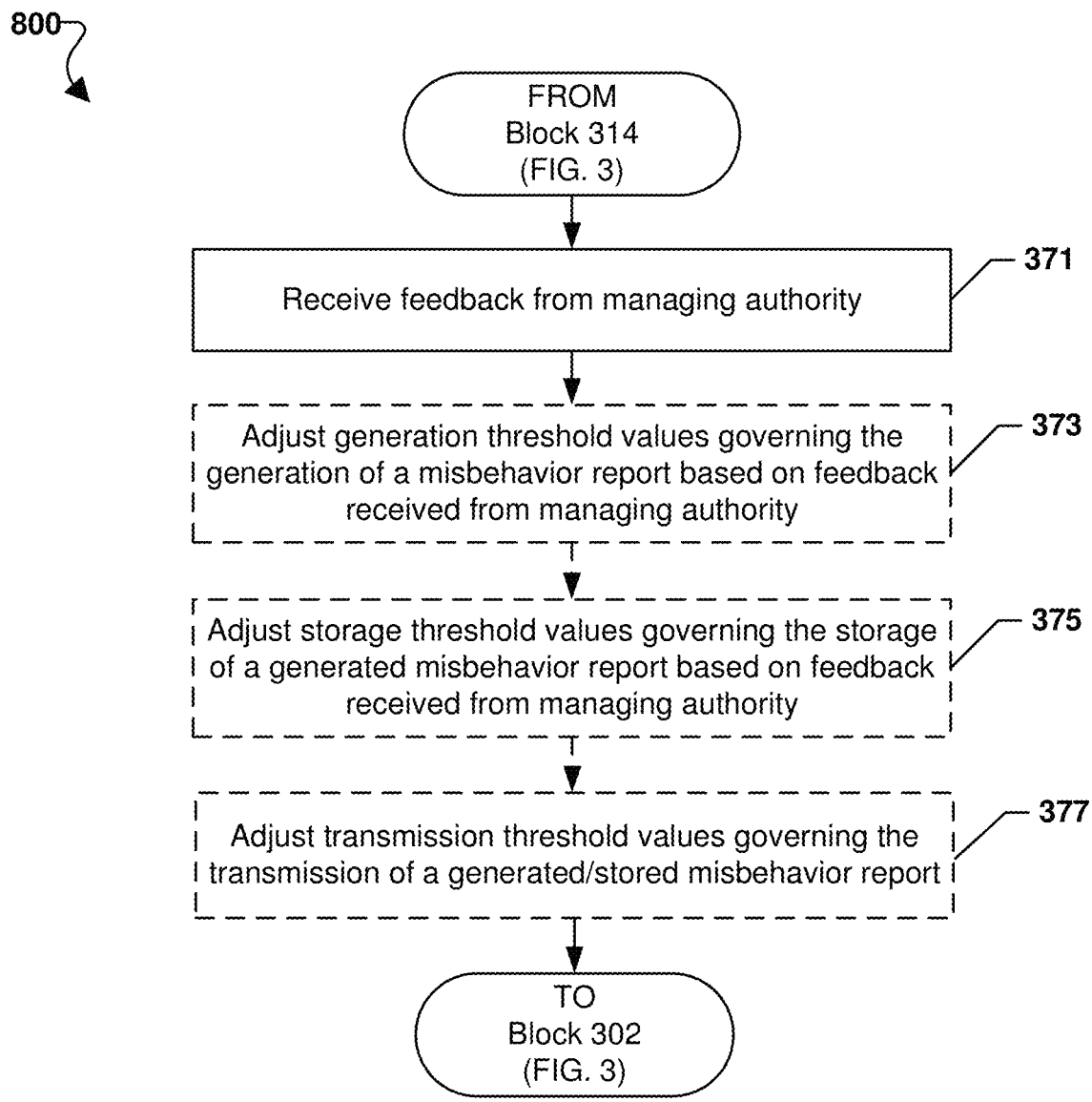
FIG. 8 is a process flow diagram illustrating example operations for adjusting threshold values in a feedback signal by a Misbehavior Management System.

FIG. 8 is a process flow diagram illustrating example operations 800 for adjusting threshold values in a feedback signal that may be performed as part of the method 300. With reference to FIGS. 1A-8, the operations 800 may be performed by a processor of a vehicle processing system (e.g., 102, 104, 106, 204). In some embodiments, as MBRs are transmitted to a central misbehavior managing authority such as a SCMS, the manner in which the MBR managing system determines whether to generate MBRs, store MBRs and transmit MBRs may be modified.

After transmitting a misbehavior report to a misbehavior managing authority in block 314 as described, the processor may receive feedback from the central misbehavior managing authority such as a SCMS in block 371. In some embodiments, this feedback may be included in a message sent from the central misbehavior managing authority to the vehicle misbehavior management system confirming or declining the existence of a misbehavior condition event. For instance, the feedback message may include a Boolean/binary value indicating whether the MBR content that was transmitted by the processor is correct (e.g., response value equals to true) or incorrect (e.g., response value equals to false). Means for performing the operations of block 371 may include the vehicle processing system 102, 104, 106, 204, the processor 205, and the radio module 218.

In some embodiments, the processor may update its initial weight factor based on the feedback from the managing authority. For instance, the processor may lower a confidence level of its local detection system if the misbehavior management system does not agree with the local detection system.

In some embodiments, in response to the feedback received from a central misbehavior managing authority, the processor may modify one or more factors that the processor uses to make its various determinations. For example, the threshold values that may result in a decision to generate, store and/or transmit may be modified based on feedback from the central misbehavior managing authority. For example, as noted above, in various determinations, the processor may assign various weight and values to a variety of factors based on how the processor determines to emphasize certain factors over others. For example, in some embodiments, repeated occurrences of the same misbehavior condition may be attributed to a faulty sensor and disregarded as a minor inconvenience. In such embodiments, repetitive occurrences may be given a low priority value.

In optional block 373, the processor may adjust one or more generation threshold values governing the generation of a misbehavior report based on feedback received from managing authority. Means for performing the operations of block 373 may include the vehicle processing system 102, 104, 106, 204, and the processor 205.

In optional block 375, the processor may adjust storage threshold values governing the storage of a generated misbehavior report based on feedback received from managing authority. Means for performing the operations of block 375 may include the vehicle processing system 102, 104, 106, 204, and the processor 205.

In optional block 377, the processor may adjust transmission threshold values governing the transmission of a generated or stored misbehavior report. Means for performing the operations of block 377 may include the vehicle processing system 102, 104, 106, 204, and the processor 205.

The processor may then analyze (e.g., monitor and analyze) various sensor data of their respective vehicles (e.g., 12, 14, 16) to determine whether a misbehavior condition is detected in block 302 as described.

For example, with reference to FIGS. 4A, 4B and 8, the misbehavior managing authority may provide feedback based on which the processor may alter values assigned to, or thresholds used to evaluate, certain detected misbehavior conditions, such that only misbehavior conditions related to the most severe safety conditions and/or that persist for an extended length of time result in the generation of an MBR. In some embodiments, the feedback from the misbehavior managing authority may inform the processor that a certain type of misbehavior is deprecated and hence no reports should be generated identifying that particular misbehavior condition.

An example of an embodiment method is disclosed as follows. A vehicle 12 with on-board V2X equipment 102 may receive a Basic Safety Message with erroneous data. The local misbehavior detection system may analyze the BSM and may conclude that the remote sender A (e.g., vehicle 14) is misbehaving, noting that the sender is sending a fake position that has the potential to trigger a wrong Electronic Emergency Brake Light warning. The misbehavior management system decides (determines) to generate a Misbehavior Report (MBR-A). The misbehavior management system (i.e., the vehicle processor) may collect the evidence (vehicle 12's own BSM, BSM(s) from remote sender(s), a list of detectors triggered, etc.), and may classify the misbehavior condition as a "fake kinematic state" and a seriousness value of "high." The misbehavior management system (i.e., the vehicle processor) may then determine to store MBR-A with an initial weight value of 1 and a decay factor of 0.1. The vehicle 12 with on-board V2X equipment 102 does not have a connection to the SCMS (to upload the MBR), hence the vehicle 12 with on-board V2X equipment 102 has to wait before transmitting it. The next day (e.g., after a pre-determined time interval of a day), the misbehavior management system may apply the decay factor to MBRA, decreasing its priority to 0.9. The vehicle 12 with on-board V2X equipment 102 may detect another misbehavior condition by a different remote sender B (e.g., vehicle 16). Sender B's misbehavior condition is a position jump within the communication range, but the processor may determine that this misbehavior condition is not safety-critical. Therefore, the processor may store MBR-B with a priority value of 0.5 and a decay factor of 0.2. The vehicle 12 with on-board V2X equipment 102 may establish a connection with the SCMS and may upload its stored MBRs, following the priority values: MBR-A→MBR-B. The misbehavior management system (i.e., the vehicle processor) may store a record of identifiers A and B for blacklisting purposes. The processor may delete MBR-A and MBR-B after receiving an acknowledgement of successful upload. Optionally, two days later, the Misbehavior Managing Authority may complete its misbehavior investigation and may provide feedback to the MBR management system. The vehicle 12 with on-board V2X equipment 102 may receive a notification that MBR-A was accurate while MBR-B was not accurate. The vehicle's misbehavior management system may adjust its generation/storage/transmission parameters accordingly, and may configured the local misbehavior detection system with adjusted internal parameters accordingly.

Figure 9:
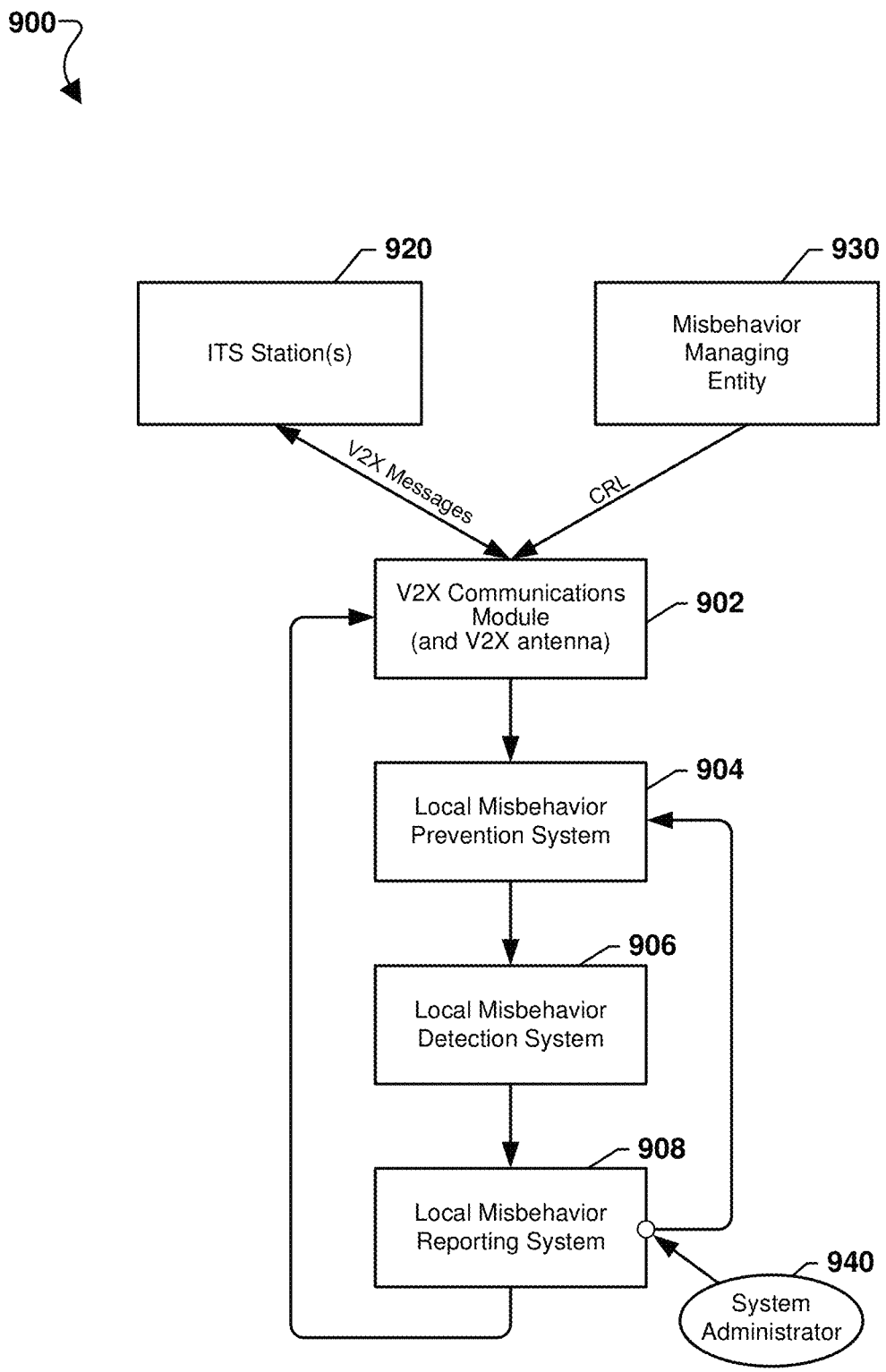
FIG. 9 is a block component diagram illustrating an example system for local misbehavior message filtering in accordance with various embodiments.

FIG. 9 is a block component diagram of an example system 900 for local misbehavior message filtering. With reference to FIGS. 1A-9, the system 900 may include a V2X communications module 902, a local misbehavior prevention system 904, a local misbehavior detection system 906, and a local misbehavior reporting system 908, and or all of which may be instantiated or performed by hardware, software, or a combination of hardware and software (for example, by components illustrated in FIGS. 11 and 12).

The V2X communications module 902 may include a V2X antenna, and may be configured to communicate with one or more ITS stations 920 and with a misbehavior managing entity 930, e.g., via wireless signals. The V2X communications module 902 may receive V2X messages from one (or more) ITS stations 920. The V2X communications module 902 also may send V2X messages to ITS station(s) 920. The V2X communications module 902 may receive a CRL from the misbehavior managing entity 930.

The local misbehavior detection system 906 may detect a V2X message that includes incorrect or spurious information. The local misbehavior detection system 906 may determine whether the incorrect information is unintentional (e.g., incorrect information reported by a malfunctioning sensor) or intentional (e.g., malicious information, or information provided by a V2X device that has been hacked).

The local misbehavior reporting system 908 may generate and send a misbehavior report (MBR) indicating the detected misbehavior to the V2X communications module 902 for transmission to the misbehavior managing entity 930. The local misbehavior reporting system 908 may also send an MBR to the local misbehavior prevention system 904.

The local misbehavior prevention system 904 may perform a filtering or firewall function to prevent a V2X message having a detected misbehavior condition from being further processed by the local misbehavior detection system 906. In some embodiments, the local misbehavior prevention system 904 may be configured with a local blocking list. The local blocking list may include station identifiers of ITS stations (e.g., 920) that have sent an incorrect or spurious V2X message. The V2X processing device may be configured to determine whether a station identifier associated with a received V2X message is present in the local blocking list, and whether to block the V2X message from further processing (e.g., by the local misbehavior detection system 906) in response to determining that the station identifier associated with the another received V2X message is present in the local blocking list.

In some embodiments, the local misbehavior reporting system 908 may include an interface that enables control of various functions by a system administrator 940. For example, the system administrator 940 may selectively enable or disable the provision of MBRs to the local misbehavior prevention system 904. In some embodiments, the system administrator 940 may enable or disable the adding of a station identifier to the local blocking list. In some embodiments, if the reporting function is disabled such that the local misbehavior reporting system 908 does not send reports to the local misbehavior prevention system 904, the local misbehavior prevention system 904 may use information provided by the misbehavior managing entity 930 to populate the local blocking list.

Figure 10A:
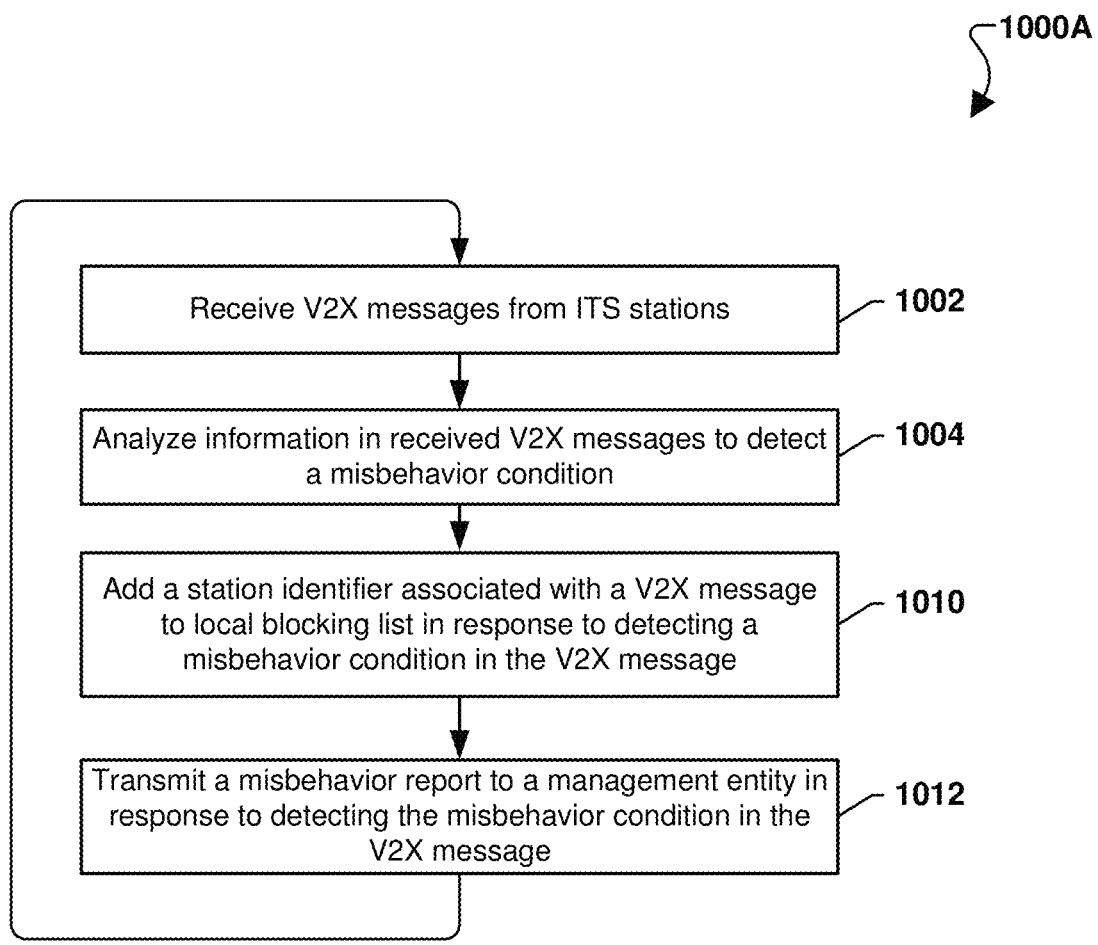
FIG. 10A is a process flow diagram illustrating an example method of local misbehavior message filtering in accordance with various embodiments.

FIG. 10A is a process flow diagram of an example method 1000A of local misbehavior message filtering in accordance with various embodiments. With reference to FIGS. 1A-10A, the operations of the method 1000A may be performed by a vehicle-to-everything (V2X) processing device (a "processor") that includes hardware, software, or a combination of hardware and software components, such as those illustrated in FIGS. 9, 11, 12, and 13.

In block 1002, the V2X processing device may receive V2X messages from intelligent transportation system (ITS) stations. Means for performing the operations of block 1002 may include vehicle processing system (e.g., V2X onboard equipment) 102, 104, 106, 204, the processor 205, and the radio module 218.

In block 1004, the V2X processing device may analyze information in the received V2X messages to detect a misbehavior condition as described herein. Means for performing the operations of block 1004 may include vehicle processing system 102, 104, 106, 204, the processor 205, In block 1010, the V2X processing device may add a station identifier associated with a V2X message having a detected misbehavior condition to a local blocking list in response to detecting a misbehavior condition in the V2X message in block 1010. Means for performing the operations of block 1010 may include vehicle processing system 102, 104, 106, 204, the processor 205.

In block 1012, the V2X processing device may transmit a misbehavior report to a management entity (e.g., the misbehavior managing entity 930). In some embodiments, adding the station identifier associated with the V2X message having the detected misbehavior condition to the local blocking list (e.g., block 1012) may be performed upon transmitting the misbehavior report to the management entity. Means for performing the operations of block 1012 may include vehicle processing system (e.g., V2X onboard equipment) 102, 104, 106, 204, the processor 205, and the radio module 218.

The V2X processing device may again receive V2X messages from ITS stations in block 1002 as described.

Figure 10B:
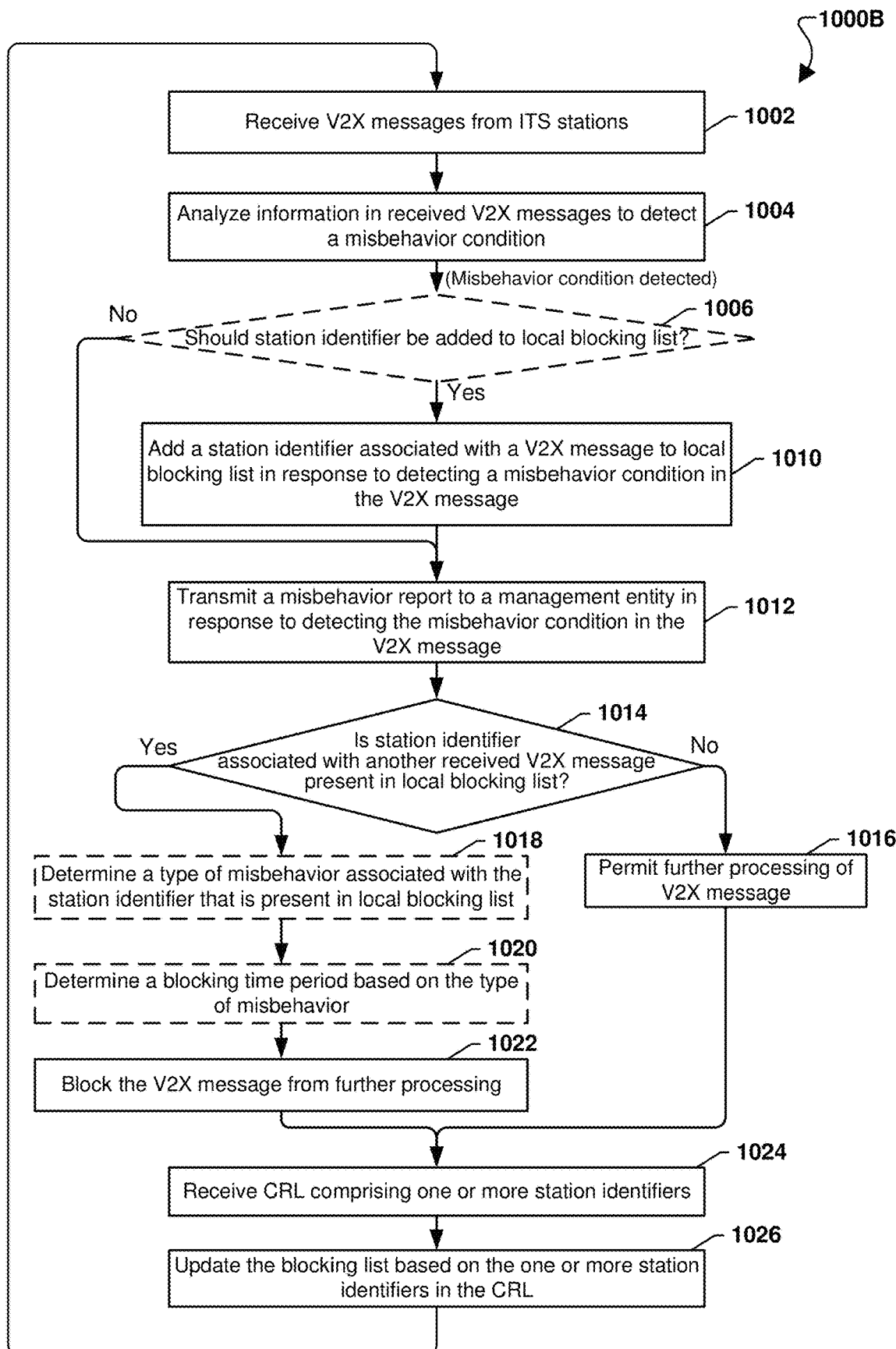
FIG. 10B is a process flow diagram illustrating an example method of local misbehavior message filtering in accordance with various embodiments.

FIG. 10B is a process flow diagram of an example method 1000B of local misbehavior message filtering in accordance with various embodiments. With reference to FIGS. 1A-10B, the operations of the method 1000B may be performed by a vehicle-to-everything (V2X) processing device that includes hardware, software, or a combination of hardware and software components, such as those illustrated in FIGS. 9, 11, 12, and 13.

In block 1002, the V2X processing device may receive V2X messages from intelligent transportation system (ITS) stations as described.

In block 1004, the V2X processing device may analyze information in the received V2X messages to detect a misbehavior condition as described herein.

In optional determination block 1006, the V2X processing device may determine whether a station identifier should be added to the local blocking list in some embodiments. For example, a system administrator (e.g., the system administrator 940) may enable or disable the function of adding station identifiers of detected misbehavior conditions to the local blocking list. In such embodiments, based on whether the function of automatically adding station identifiers of detected misbehavior conditions to the local blocking list is enabled or disabled, the V2X processing device (e.g., the local misbehavior detection system 906) may analyze information in the received V2X messages to detect a misbehavior condition. Means for performing the operations of optional determination block 1006 may include vehicle processing system 102, 104, 106, 204, and the processor 205.

In response to determining that the station identifier should be added to the local blocking list (i.e., optional determination block 1006="Yes"), the V2X processing device may add a station identifier associated with a V2X message having a detected misbehavior condition to a local blocking list in response to detecting a misbehavior condition in the V2X message in block 1010 as described.

In response to determining that the station identifier should not be added to the local blocking list (i.e., optional determination block 1006="No") or following performance of the operations of block 1010, the V2X processing device may transmit a misbehavior report to a management entity (e.g., the misbehavior managing entity 930) in response to detecting the misbehavior condition in the V2X message in block 1012 as described. In some embodiments, adding the station identifier associated with the V2X message having the detected misbehavior condition to the local blocking list (e.g., block 1012) may be performed upon transmitting the misbehavior report to the management entity.

In determination block 1014, the V2X processing device may determine whether a station identifier associated with another received V2X message is present in the local blocking list. For example, when the V2X processor receives another (a second) V2X message, the V2X processor may determine whether a station identifier (e.g., the message certificate) associated with the second V2X message is present on the local blocking list. Means for performing the operations of determination block 1014 may include vehicle processing system 102, 104, 106, 204, and the processor 205.

In response to determining that the station identifier associated with another received V2X message is not present in the local blocking list (i.e., determination block 1014="No"), the V2X processing device may permit processing of the V2X message in block 1016. For example, the V2X processing device may permit further processing of the V2X message by the local misbehavior detection system 906. Means for performing the operations of block 1016 may include vehicle processing system 102, 104, 106, 204, and the processor 205.

In response to determining that the station identifier associated with another received V2X message is present in the local blocking list (i.e., determination block 1014="Yes"), in some embodiments, the V2X processing device may determine a type of misbehavior associated with the station identifier that is present in the local blocking list in optional block 1018. For example, the V2X processing device may determine whether misbehavior associated with the station identifier is intentional misbehavior or unintentional misbehavior. Means for performing the operations of optional block 1018 may include vehicle processing system 102, 104, 106, 204, and the processor 205.

In optional block 1020, the V2X processing device may determine a blocking time period based on the type of misbehavior. For example, the V2X processing device may determine a relatively short time period for unintentional misbehavior. As another example, the V2X processing device may determine a relatively long time period for intentional misbehavior. Means for performing the operations of optional block 1020 may include vehicle processing system 102, 104, 106, 204, and the processor 205.

In various embodiments, following the performance of the operations of optional block 1020, or in response to determining that the station identifier associated with another received V2X message is present in the local blocking list (i.e., determination block 1014="Yes"), the V2X processing device may block the V2X message from further processing in block 1022 (e.g., by the local misbehavior detection system 906). Means for performing the operations of block 1022 may include vehicle processing system 102, 104, 106, 204, and the processor 205.

Following performance of the operations of block 1016 or block 1022, the V2X processing device may receive a CRL that includes one or more station identifiers in block 1024. Means for performing the operations of block 1024 may include vehicle processing system 102, 104, 106, 204, the processor 205, and the radio module 218.

In block 1026, the V2X processing device may update the local blocking list based on the one or more station identifiers in the CRL. In some embodiments, the V2X processing device may remove from the local blocking list one or more station identifiers that are not present in the CRL. As another example, the V2X processing device may retain on the local blocking list, or add to the local blocking list, one or more station identifiers that are present in the CRL. Means for performing the operations of block 1026 may include vehicle processing system 102, 104, 106, 204, and the processor 205.

The V2X processing device may perform the operations of the method 1000B continuously or periodically by again performing the operations of receiving the V2X messages in block 1002. In various embodiments, the V2X processing device may iteratively perform the operations of block 1002-1026 from time to time.

Figure 10C:
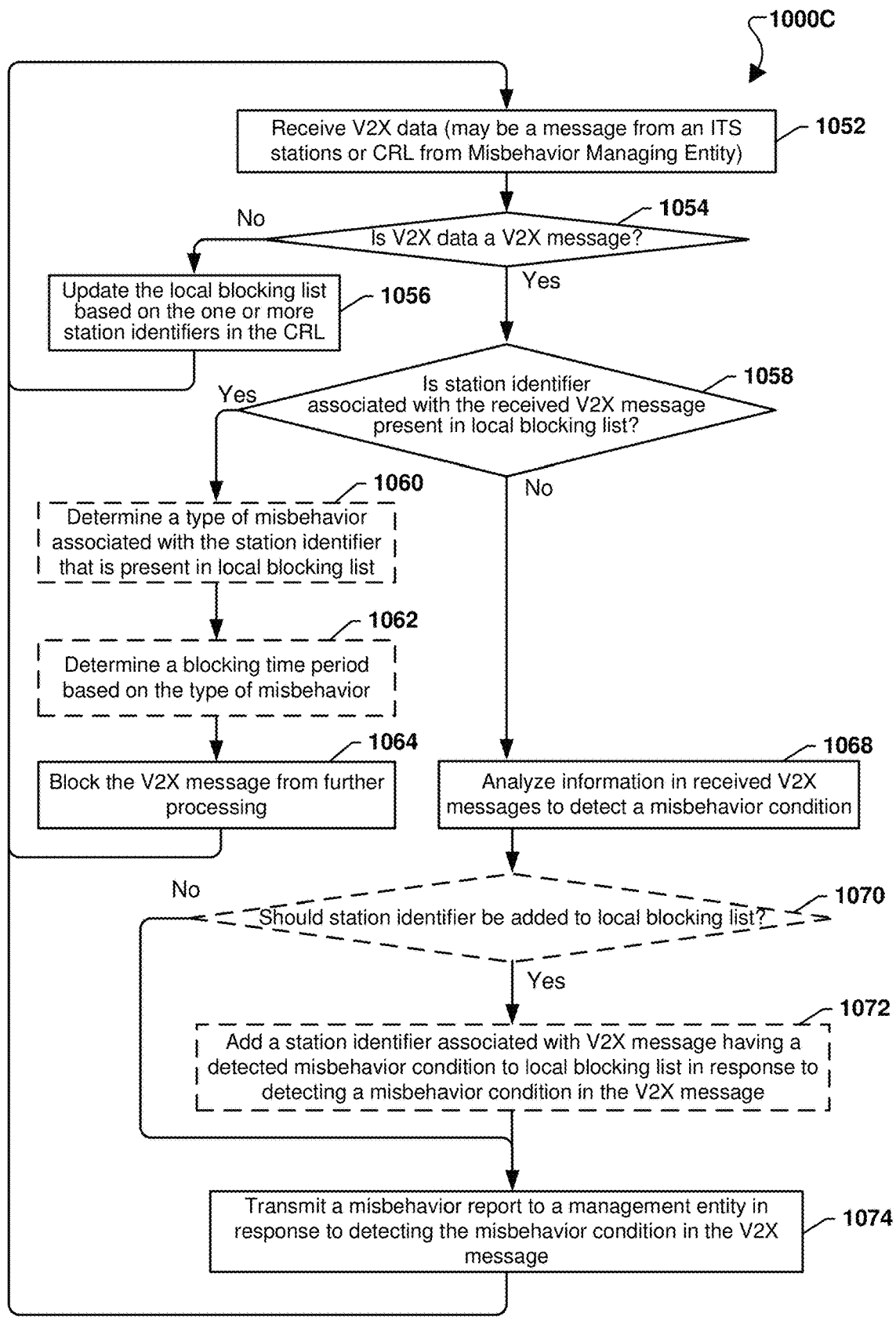
FIG. 10C is a process flow diagram illustrating an example method of local misbehavior message filtering in accordance with various embodiments.

FIG. 10C is a process flow diagram of an example method 1000C of local misbehavior message filtering in accordance with various embodiments. With reference to FIGS. 1A-10C, the operations of the method 1000C may be performed by a vehicle-to-everything (V2X) processing device that includes hardware, software, or a combination of hardware and software components, such as those illustrated in FIGS. 9, 11, 12, and 13.

In block 1052, the V2X processing device may receive V2X data. The V2X data may include a V2X message from an ITS station (e.g., 920) or a CRL from a misbehavior managing entity (e.g., 930). Means for performing the operations of block 1052 may include vehicle processing system 102, 104, 106, 204, the processor 205, and the radio module 218.

In determination block 1054, the V2X processing device may determine whether the V2X data is a V2X message. Means for performing the operations of determination block 1054 may include vehicle processing system 102, 104, 106, 204, and the processor 205.

In response to determining that the V2X data is not a V2X message (i.e., determination block 1054="No"), (e.g., the V2X data is a CRL) the V2X processing device may update the local blocking list based on the one or more station identifiers in the CRL in block 1056. Means for performing the operations of block 1056 may include vehicle processing system 102, 104, 106, 204, and the processor 205. The V2X processing device may again perform the operations of block 1052 as described.

In response to determining that the V2X data is a V2X message (i.e., determination block 1054="Yes") the V2X processing device may determine whether a station identifier associated with the received V2X message is present in the local blocking list in determination block 1058. Means for performing the operations of determination block 1058 may include vehicle processing system 102, 104, 106, 204, and the processor 205.

In response to determining that the station identifier associated with the received V2X message is present in the blocking list (i.e., determination block 1058="Yes"), in some embodiments, the V2X processing device may determine a type of misbehavior associated with the station identifier that is present in the local blocking list in optional block 1060. For example, the V2X processing device may determine whether the misbehavior associated with the station identifier is an intentional misbehavior or an unintentional misbehavior. Means for performing the operations of optional block 1060 may include vehicle processing system 102, 104, 106, 204, and the processor 205.

In optional block 1062, the V2X processing device may determine a blocking time period based on the type of misbehavior. For example, the V2X processing device may determine a relatively short time period for an unintentional misbehavior. As another example, the V2X processing device may determine a relatively long time period for an intentional misbehavior. Means for performing the operations of optional block 1062 may include vehicle processing system 102, 104, 106, 204, and the processor 205.

In block 1064, the V2X processing device may receive a CRL that includes one or more station identifiers in block 1024. Means for performing the operations of optional block 1060 may include vehicle processing system 102, 104, 106, 204, the processor 205, and the radio module 218. The V2X processing device may then repeat the method 1000A by again performing the operations of block 1052 as described.

In response to determining that the station identifier associated with the received V2X message is not present in the local blocking list (i.e., determination block 1058="No"), the V2X processing device may analyze information in the received V2X messages to detect a misbehavior condition in block 1068. Means for performing the operations of block 1068 may include vehicle processing system 102, 104, 106, 204, and the processor 205.

In optional determination block 1070, in some embodiments, the V2X processing device may determine whether a station identifier should be added to the local blocking list. For example, a system administrator (e.g., the system administrator 940) may enable or disable the function of adding station identifiers of detected misbehavior conditions to the local blocking list. In such embodiments, based on whether the function of automatically adding station identifiers of detected misbehavior conditions to the local blocking list is enabled or disabled, the V2X processing device (e.g., the local misbehavior detection system 906) may analyze information in the received V2X messages to detect a misbehavior condition. Means for performing the operations of optional determination block 1070 may include vehicle processing system 102, 104, 106, 204, and the processor 205.

In response to determining that the station identifier should be added to the local blocking list (i.e., optional determination block 1070="Yes"), the V2X processing system may add a station identifier associated with the V2X message having a detected misbehavior condition to the local blocking list in response to detecting a misbehavior condition in the V2X message in optional block 1072. Means for performing the operations of optional block 1072 may include vehicle processing system 102, 104, 106, 204, and the processor 205.

In response to determining that the station identifier should not be added to the local blocking list (i.e., optional determination block 1070="No") or following performance of the operations of optional block 1072, the V2X processing device may transmit a misbehavior report to a management entity (e.g., the misbehavior managing entity 930) in response to detecting the misbehavior condition in the V2X message in block 1074. Means for performing the operations of block 1074 may include vehicle processing system 102, 104, 106, 204, the processor 205, and the radio module 218. The V2X processing device may then repeat the method 1000A by again performing the operations of block 1052 as described.

Figure 11:
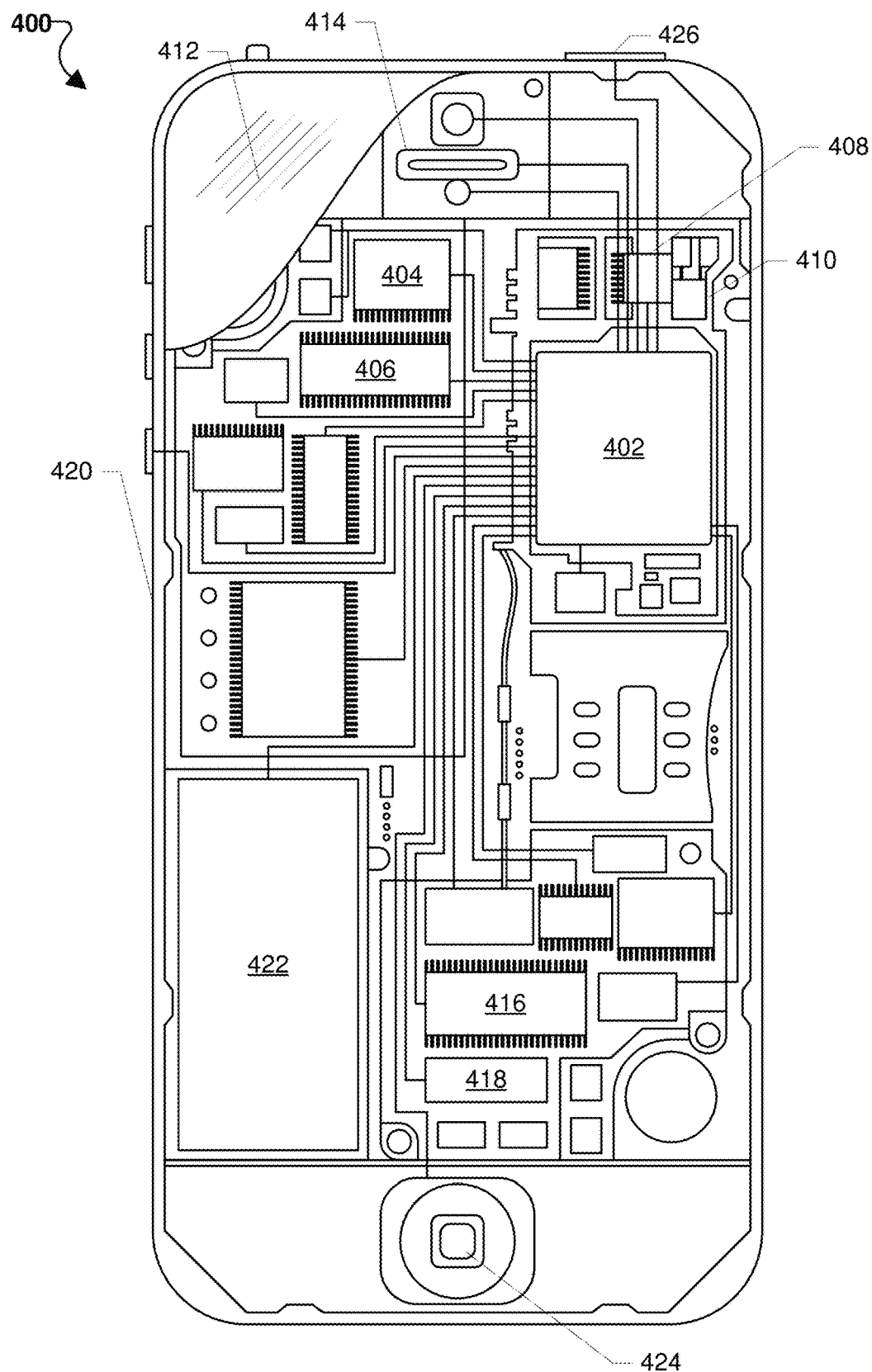
FIG. 11 is a component block diagram illustrating an example mobile computing device suitable for use with various embodiments.

FIG. 11 is a component block diagram illustrating an example mobile computing device 400 suitable for use with various embodiments. With reference to FIGS. 1A-11, various embodiments (including, but not limited to, embodiments described above with reference to FIGS. 1A-10C) may be implemented in a wide variety of computing systems including on-board equipment as well as mobile computing devices, such as the mobile computing device 400. The mobile computing device 400 may include a processor 402 coupled to a touchscreen controller 404 and an internal memory 406. The processor 402 may be one or more multicore integrated circuits designated for general or specific processing tasks. The internal memory 406 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 404 and the processor 402 may also be coupled to a touchscreen panel 412, such as a resistive-sensing touchscreen, capacitive-sensing touchscreen, infrared sensing touchscreen, etc. Additionally, the display of the mobile computing device 400 need not have touch screen capability.

The mobile computing device 400 may have one or more radio signal transceivers 408 (e.g., Peanut, Bluetooth, ZigBee, Wi-Fi, RF radio) and antennae 410, for sending and receiving communications, coupled to each other and/or to the processor 402. The transceivers 408 and antennae 410 may be used with the above-mentioned circuitry to implement the various wireless transmission protocol stacks and interfaces. The mobile computing device 400 may include a cellular network wireless modem chip 416 that enables communication via a cellular network and is coupled to the processor.

The mobile computing device 400 may include a peripheral device connection interface 418 coupled to the processor 402. The peripheral device connection interface 418 may be singularly configured to accept one type of connection, or may be configured to accept various types of physical and communication connections, common or proprietary, such as Universal Serial Bus (USB), FireWire, Thunderbolt, or PCIe. The peripheral device connection interface 418 may also be coupled to a similarly configured peripheral device connection port (not shown).

The mobile computing device 400 may also include speakers 414 for providing audio outputs. The mobile computing device 400 may also include a housing 420, constructed of a plastic, metal, or a combination of materials, for containing all or some of the components described herein. One of ordinary skill in the art may recognize that the housing 420 may be a dashboard counsel of a vehicle in an on-board embodiment. The mobile computing device 400 may include a power source 422 coupled to the processor 402, such as a disposable or rechargeable battery. The rechargeable battery may also be coupled to the peripheral device connection port to receive a charging current from a source external to the mobile computing device 400. The mobile computing device 400 may also include a physical button 424 for receiving user inputs. The mobile computing device 400 may also include a power button 426 for turning the mobile computing device 400 on and off.

Figure 12:
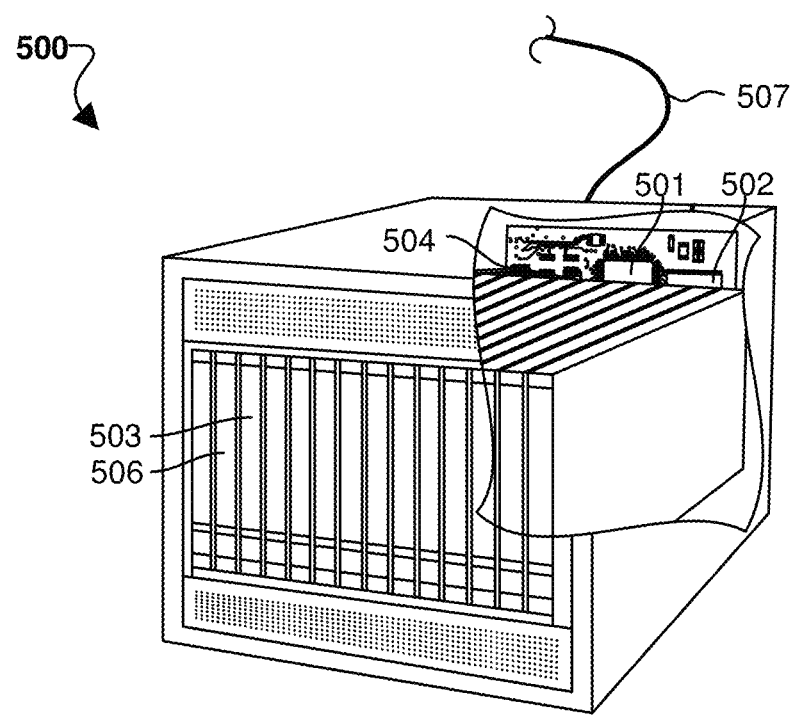
FIG. 12 is a component block diagram illustrating an example server suitable for use with various embodiments.

FIG. 12 is a component block diagram illustrating an example server 500 suitable for use with various embodiments. With reference to FIGS. 1A-12, various embodiments (including, but not limited to, embodiments described above with reference to FIGS. 1A-10C) may also include a Misbehavior Managing Authority utilizes fixed computing systems, such as any of a variety of commercially available servers, such as the server 500. Such a server 500 typically includes one or more multicore processor assemblies 501 coupled to volatile memory 502 and a large capacity nonvolatile memory, such as a disk drive 504. As illustrated in FIG. 12, multicore processor assemblies 501 may be added to the server 500 by inserting them into the racks of the assembly. The server 500 may also include a floppy disc drive, compact disc (CD) or digital versatile disc (DVD) disc drive 506 coupled to the processor 501. The server 500 may also include network access ports 503 coupled to the multicore processor assemblies 501 for establishing network interface connections with a network 507, such as a local area network coupled to other broadcast system computers and servers, the Internet, the public switched telephone network, and/or a cellular data network (e.g., CDMA, TDMA, GSM, PCS, 3G, 4G, 5G, LTE, or any other type of cellular data network).

Implementation examples are described in the following paragraphs. While some of the following implementation examples are described in terms of example methods, further example implementations may include: the example methods discussed in the following paragraphs implemented by a V2X processing device that may be an on-board unit, mobile device unit, mobile computing unit, or stationary roadside unit including a processor configured with processor-executable instructions to perform operations of the methods of the following implementation examples; the example methods discussed in the following paragraphs implemented by a V2X processing device including means for performing functions of the methods of the following implementation examples; and the example methods discussed in the following paragraphs may be implemented as a non-transitory processor-readable storage medium having stored thereon processor-executable instructions configured to cause a processor of a V2X processing device to perform the operations of the methods of the following implementation examples.

Example 1. A method of local misbehavior management performed by a vehicle-to-everything (V2X) processing device, including receiving a V2X message from an intelligent transportation system (ITS) station, analyzing information in the received V2X message to detect the misbehavior condition in the V2X message; and adding a station identifier associated with the V2X message received from the ITS station to a local blocking list in response to detecting a misbehavior condition in the V2X message received from the ITS station.

Example 2. The method of example 1, further including transmitting a misbehavior report to a management entity in response to detecting the misbehavior condition in the V2X message.

Example 3. The method of example 2, in which transmitting the misbehavior report to the management entity in response to detecting the misbehavior condition in the V2X message is performed upon adding the station identifier associated with the V2X message received from an ITS station to the local blocking list.

Example 4. The method of any of examples 1-3, further including determining whether a station identifier associated with another received V2X message is present in the local blocking list, and blocking the V2X message from further processing in response to determining that the station identifier associated with the another received V2X message is present in the local blocking list.

Example 5. The method of example 4, further including determining a type of misbehavior associated with the station identifier that is present in the local blocking list, and determining a blocking time period based on the type of misbehavior, in which blocking the V2X message from further processing in response to determining that the station identifier associated with the V2X message is present in the local blocking list includes blocking the V2X message from further processing for the blocking time period.

Example 6. The method of any of examples 1-5, in which adding the station identifier associated with the V2X message received from an ITS station to the local blocking list in response to detecting a misbehavior condition in the V2X message received from the ITS station comprises includes determining whether to add the station identifier associated with the V2X message received from the ITS station to the local blocking list in response to detecting a misbehavior condition in the V2X message received from the ITS station, and adding the station identifier associated with the V2X message to the local blocking list in response to determining that the station identifier should be added to the local blocking list.

Example 7. The method of any of examples 1-6, further including receiving a certificate revocation list (CRL) including one or more station identifiers, and updating the local blocking list based on the one or more station identifiers in the CRL.

Example 8. The method of example 7, in which updating the local blocking list based on the one or more station identifiers of the CRL includes removing the station identifier associated with the V2X message from the local blocking list.

Example 9. The method of example 7, in which updating the local blocking list based on the one or more station identifiers of the CRL includes increasing a blocking time period for the station identifier associated with the V2X message.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of local misbehavior message filtering performed by a vehicle-to-everything (V2X) processing device, comprising:
   receiving a V2X message from an intelligent transportation system (ITS) station;
   analyzing information in the received V2X message to detect misbehavior conditions in the V2X message;
   adding a station identifier associated with the V2X message received from the ITS station to a local blocking list in response to detecting a misbehavior condition in the V2X message received from the ITS station;
   determining a blocking time period during which V2X messages associated with the station identifier are blocked from further processing based on a type of misbehavior associated with the station identifier that is present in the local blocking list; and
   blocking the V2X messages associated with the station identifier from further processing for the blocking time period.

2. The method of claim 1, further comprising transmitting a misbehavior report to a management entity in response to detecting the misbehavior condition in the V2X message.

3. The method of claim 2, wherein transmitting the misbehavior report to the management entity in response to detecting the misbehavior condition in the V2X message is performed upon adding the station identifier associated with the V2X message received from an ITS station to the local blocking list.

4. The method of claim 1, further comprising:
   determining whether a station identifier associated with another received V2X message is present in the local blocking list,
   wherein blocking V2X messages associated with the station identifier from further processing for the blocking time period comprises blocking the V2X message from further processing in response to determining that the station identifier associated with another received V2X message is present in the local blocking list.

5. The method of claim 1, wherein adding the station identifier associated with the V2X message received from an ITS station to the local blocking list in response to detecting a misbehavior condition in the V2X message received from the ITS station comprises:
   determining whether to add the station identifier associated with the V2X message received from the ITS station to the local blocking list in response to detecting a misbehavior condition in the V2X message received from the ITS station; and
   adding the station identifier associated with the V2X message to the local blocking list in response to determining that the station identifier should be added to the local blocking list.

6. The method of claim 1, further comprising:
   receiving a certificate revocation list (CRL) comprising one or more station identifiers; and
   updating the local blocking list based on the one or more station identifiers in the CRL.

7. The method of claim 6, wherein updating the local blocking list based on the one or more station identifiers of the CRL comprises removing a station identifier associated with the V2X message from the local blocking list.

8. The method of claim 6, wherein updating the local blocking list based on the one or more station identifiers of the CRL comprises increasing the blocking time period for the station identifier associated with the V2X message.

9. A vehicle-to-everything (V2X) processing device, comprising: a processor configured with processor-executable instructions to:
   receive a V2X message from an intelligent transportation system (ITS) station;
   analyze information in the received V2X message to detect misbehavior conditions in the V2X message;
   add a station identifier associated with the V2X message received from the ITS station to a local blocking list in response to detecting a misbehavior condition in the V2X message received from the ITS station;
   determine a blocking time period during which V2X messages associated with the station identifier are blocked from further processing based on a type of misbehavior associated with the station identifier that is present in the local blocking list; and
   block the V2X messages associated with the station identifier from further processing for the blocking time period.

10. The V2X processing device of claim 9, wherein the processor is further configured with processor-executable instructions to transmit a misbehavior report to a management entity in response to detecting the misbehavior condition in the V2X message.

11. The V2X processing device of claim 10, wherein the processor is further configured with processor-executable instructions to transmit the misbehavior report to the management entity in response to detecting the misbehavior condition in the V2X message upon adding the station identifier associated with the V2X message received from an ITS station to the local blocking list.

12. The V2X processing device of claim 9, wherein the processor is further configured with processor-executable instructions to:
   determine whether a station identifier associated with another received V2X message is present in the local blocking list,
   wherein the processor is further configured with processor-executable instructions to block the V2X associated with the station identifier from further processing for the blocking time period in response to determining that the station identifier associated with the another received V2X message is present in the local blocking list.

13. The V2X processing device of claim 9, wherein the processor is further configured with processor-executable instructions to:
   determine whether to add the station identifier associated with the V2X message received from the ITS station to the local blocking list in response to detecting a misbehavior condition in the V2X message received from the ITS station; and
   add the station identifier associated with the V2X message to the local blocking list in response to determining that the station identifier should be added to the local blocking list.

14. The V2X processing device of claim 9, wherein the processor is further configured with processor-executable instructions to:
   receive a certificate revocation list (CRL) comprising one or more station identifiers; and
   update the local blocking list based on the one or more station identifiers in the CRL.

15. The V2X processing device of claim 14, wherein the processor is further configured with processor-executable instructions to remove a station identifier associated with the V2X message from the local blocking list.

16. The V2X processing device of claim 14, wherein the processor is further configured with processor-executable instructions to increase the blocking time period for the station identifier associated with the V2X message.

17. A vehicle-to-everything (V2X) processing device, comprising:
   means for receiving a V2X message from an intelligent transportation system (ITS) station;
   means for analyzing information in the received V2X message to detect misbehavior conditions in the V2X message;
   means for adding a station identifier associated with a V2X message received from ITS) station to a local blocking list in response to detecting a misbehavior condition in the V2X message received from the ITS station;
   means for determining a blocking time period during which V2X messages associated with the station identifier are blocked from further processing based on a type of misbehavior associated with the station identifier that is present in the local blocking list; and
   means for blocking the V2X messages associated with the station identifier from further processing for the blocking time period.

18. The V2X processing device of claim 17, further comprising means for transmitting a misbehavior report to a management entity in response to detecting the misbehavior condition in the V2X message.

19. The V2X processing device of claim 18, wherein means for transmitting the misbehavior report to the management entity in response to detecting the misbehavior condition in the V2X message includes means for adding the station identifier associated with the V2X message received from an ITS station to the local blocking list.

20. The V2X processing device of claim 17, further comprising:
    means for determining whether a station identifier associated with another received V2X message is present in the local blocking list,
    wherein means for blocking the V2X message from further processing for the blocking time period comprises means for blocking the V2X message from further processing in response to determining that the station identifier associated with the another received V2X message is present in the local blocking list.

21. The V2X processing device of claim 17, wherein means for adding the station identifier associated with the V2X message received from an ITS station to the local blocking list in response to detecting a misbehavior condition in the V2X message received from the ITS station comprises:
    means for determining whether to add the station identifier associated with the V2X message received from the ITS station to the local blocking list in response to detecting a misbehavior condition in the V2X message received from the ITS station; and
    means for adding the station identifier associated with the V2X message to the local blocking list in response to determining that the station identifier should be added to the local blocking list.

22. The V2X processing device of claim 17, further comprising:
    means for receiving a certificate revocation list (CRL) comprising one or more station identifiers; and
    means for updating the local blocking list based on the one or more station identifiers in the CRL.

23. The V2X processing device of claim 22, wherein means for updating the local blocking list based on the one or more station identifiers of the CRL comprises means for removing a station identifier associated with the V2X message from the local blocking list.

24. The V2X processing device of claim 22, wherein means for updating the local blocking list based on the one or more station identifiers of the CRL comprises means for increasing the blocking time period for the station identifier associated with the V2X message.

25. A non-transitory processor-readable medium having stored thereon processor-executable instructions configured to cause a processor of a V2X processing device to perform operations comprising:
    receiving a V2X message from an intelligent transportation system (ITS) station;
    analyzing information in the received V2X message to detect misbehavior conditions in the V2X message;
    adding a station identifier associated with the V2X message received from the ITS station to a local blocking list in response to detecting a misbehavior condition in the V2X message received from the ITS station;
    determining a blocking time period during which V2X messages associated with the station identifier are blocked from further processing based on a type of misbehavior associated with the station identifier that is present in the local blocking list; and
    blocking the V2X messages associated with the station identifier from further processing for the blocking time period.

* * * * *